US010203166B2

(12) United States Patent
Gil et al.

(10) Patent No.: US 10,203,166 B2
(45) Date of Patent: Feb. 12, 2019

(54) HEAT RECOVERY APPARATUS AND METHOD

(71) Applicant: 2078095 Ontario Limited, Toronto (CA)

(72) Inventors: Vicente Gil, Toronto (CA); John Gil, Toronto (CA); Camilo Gil, Toronto (CA); Adelino Ribeiro, Richmond Hill (CA); David Ribeiro, Richmond Hill (CA)

(73) Assignee: 2078095 Ontario Limited, Toronto, Ontario (CA)

( * ) Notice: Subject to any disclaimer, the term of this patent is extended or adjusted under 35 U.S.C. 154(b) by 329 days.

(21) Appl. No.: 14/845,737

(22) Filed: Sep. 4, 2015

(65) Prior Publication Data

US 2016/0069617 A1 Mar. 10, 2016

Related U.S. Application Data

(60) Provisional application No. 62/046,570, filed on Sep. 5, 2014.

(51) Int. Cl.
*F28D 21/00* (2006.01)
*E03C 1/00* (2006.01)
(Continued)

(52) U.S. Cl.
CPC ......... *F28D 21/0012* (2013.01); *F28D 7/024* (2013.01); *F28D 7/026* (2013.01);
(Continued)

(58) Field of Classification Search
CPC .. F24D 11/025; F24D 17/0005; F24D 17/001; F24D 17/0042; F24D 17/0052;
(Continued)

(56) References Cited

U.S. PATENT DOCUMENTS 1,955,477 A * 4/1934 Turner ................ F28D 21/0017
165/108
1,989,340 A * 1/1935 Shepherd .............. F28D 7/1646
165/101
(Continued)

FOREIGN PATENT DOCUMENTS

DE 102008017380 A1 3/2009
EP 2693146 A1 2/2014
(Continued)

OTHER PUBLICATIONS

Intewa: Create portable water easily and economically with new water system technology that also combines heat recovery; dated May 1, 2014.
(Continued)

*Primary Examiner* — Len Tran
*Assistant Examiner* — Hans Weiland
(74) *Attorney, Agent, or Firm* — Ridout and Maybee LLP

(57) ABSTRACT

A grey water heat recovery apparatus has first and second passes arranged in counter-flow orientation. The heat recovery apparatus is made from commonly available materials. It has a hot side for grey water, and a cold side for fresh water under pressure. The heat recovery apparatus extracts heat from grey water to pre-heat water for a water heater. The fresh water is carried in passes in series, each pass being immersed in a grey water sump in a plastic pipe. The water level in the sump is high enough to immerse the dominant portion of the fresh water pass in grey water. Both ends of the fresh water coil are carried out through the same upper end pipe closure, without a penetration in the pipe wall. The entire assembly may be enclosed in a unitary external housing with easily accessible connection fittings.

29 Claims, 18 Drawing Sheets

(51) Int. Cl.
*F28D 7/02* (2006.01)
*F28D 7/16* (2006.01)
*F28F 1/00* (2006.01)

(52) U.S. Cl.
CPC ............ *F28D 7/1669* (2013.01); *F28F 1/003* (2013.01); *E03C 2001/005* (2013.01); *Y02A 20/302* (2018.01); *Y02B 30/566* (2013.01)

(58) Field of Classification Search
CPC ........ F28D 7/024; F28D 7/026; F28D 7/1638; F28D 7/1669; F28D 21/0012; F28F 1/003; E03C 2001/005; Y02B 30/566
See application file for complete search history.

(56) References Cited

U.S. PATENT DOCUMENTS

| | | | | |
|---|---|---|---|---|
| 4,202,406 | A | * | 5/1980 | Avery .................... F24D 17/001 137/386 |
| 4,454,911 | A | * | 6/1984 | Arbabian ............ F24D 17/0005 165/104.14 |
| 4,531,572 | A | | 7/1985 | Molitor |
| 5,148,858 | A | * | 9/1992 | Ovretveit ............ F28D 21/0012 165/103 |
| 5,301,745 | A | * | 4/1994 | Seib ..................... F24D 17/001 165/119 |
| 2011/0024080 | A1 | | 2/2011 | Bose et al. |
| 2011/0107512 | A1 | | 5/2011 | Gilbert |
| 2011/0203786 | A1 | * | 8/2011 | Darnell ................ F24D 17/001 165/287 |
| 2011/0226341 | A1 | | 9/2011 | Platteel et al. |
| 2012/0255706 | A1 | | 10/2012 | Tadayon et al. |
| 2012/0318483 | A1 | | 12/2012 | Cosby |
| 2013/0228309 | A1 | | 9/2013 | Wood et al. |

FOREIGN PATENT DOCUMENTS

| | | |
|---|---|---|
| GB | 2247072 A | 2/1992 |
| WO | 2011/158032 A2 | 12/2011 |
| WO | 2014/029992 A1 | 2/2014 |

OTHER PUBLICATIONS

CANMET Energy Technology Centre: Design and Analysis of a Residential Greywater Heat Recover System; dated Feb. 12, 2003.
TotalPatent: machine English translation of the abstract, as retrieved in connection to German patent publication DE102008017380.

* cited by examiner

HEAT RECOVERY APPARATUS AND METHOD

This application claims the benefit of priority of U.S. Provisional Patent Application 62/046,570 filed Sep. 5, 2014, the specification and drawings thereof being incorporated in their entirety herein.

FIELD OF INVENTION

This description relates to the field of apparatus for heat recovery from grey water, particularly as in residential installations.

BACKGROUND OF THE INVENTION

It is known to recover heat from grey water that would otherwise be subject to disposal. Examples of such systems are shown in WIPO publication WO 2014/029992 of Murray, et al., and US Publication 2011/0 107,512 of Gilbert.

SUMMARY OF INVENTION

The following summary precedes the more detailed discussion to follow. The summary is not intended to, and does not, limit or define the claims.

In an aspect of the invention there is a grey water heat recovery apparatus in which heat is transferred between a grey water stream and a fresh water stream. The apparatus includes a heat exchanger that has at least a first pass and a second pass. The first pass and second pass are mounted in series. The heat exchanger has a gravity-fed grey water flow path, the grey water flow path including a first portion in the first pass, and a second portion in the second pass. The grey water flow path has a source inlet, and a drain outlet. The grey water flow path has an intermediate portion lower than the drain outlet. The heat exchanger has a pressure-fed fresh water flow path. The fresh water flow path is segregated from the grey water flow path. The fresh water flow path has a counter-flow orientation relative to the grey water flow path. The fresh water flow path of the heat exchanger is at least predominantly immersed in the grey water flow path. The fresh water flow path has a fresh water source and a fresh water outlet, both the fresh water source and the fresh water outlet is positioned at respective heights higher than the drain outlet of the grey water flow path. The heat exchanger is free of fresh water wall penetrations of the grey water flow path lower than the drain outlet of the grey water flow path.

In a feature of that aspect of the invention, the first pass and the second pass are of substantially the same size and are mounted side-by-side. In another feature, the heat exchanger has more than two passes, and the more than two passes are mounted in a side-by-side bundle. In yet another feature, the first pass includes a first shell defining an outer wall of a first portion of the grey water flow path; the second pass includes a second shell defining an outer wall of a second portion of the grey water flow path; the fresh water flow path includes a first portion and a second portion; the first portion of the fresh water flow path is nested within the first shell; and the second portion of the fresh water flow path is nested within the second shell. In a further feature, the first shell has a resting sump fluid level, and the first portion of the fresh water flow path has an entrance to and an exit from the first shell, both of the entrance and the exit is at a level at least as high as the resting sump fluid level. In another feature, the first shell has at least one plug fitting; the first portion of the fresh water flow path has an entrance to and an exit from the first shell; both of the entrance and the exit is carried through a plug fitting of the at least one plug fittings. In still another feature, the first shell is made from a cylindrical pipe; the cylindrical pipe has a first end and a second end; the cylindrical pipe has at least a first plug fitting; the first plug fitting mates with the first end of the cylindrical pipe; the first portion of the fresh water flow path has an entrance and an exit; and the entrance and the exit of the fresh water flow path are mounted through the first plug fitting.

In another feature, the first pass includes a first plastic cylindrical pipe defining an outer wall of a first portion of the grey water flow path. The second pass includes a second plastic cylindrical pipe defining an outer wall of a second portion of the grey water flow path. The fresh water flow path includes a first portion and a second portion. The first portion of the fresh water flow path includes a first coil nested within the first shell. The second portion of the fresh water flow path includes a second coil nested within the second shell. The second coil has a fresh-water connection fitting. The first and second coils are connected in series. The first and second coils are made of metal, e.g., copper or stainless steel.

In a further feature, each of the first and second coils is a copper coil. Each of the first and second cylindrical plastic pipes is predominantly upstanding. Each of the first and second plastic pipes has a bottom end closure. Each of the first and second plastic pipes has a top end closure. Each of the first and second coils has a return leg, whereby each of the first portion and the second portion of the fresh water flow path has first and second terminations, and the first and second terminations pass through the top end closure of the first and second cylindrical plastic pipes, respectively. The top end closures of the first and second cylindrical plastic pipes is higher than the drain outlet of the grey water flow path. The first and second cylindrical plastic pipes and the first and second coils extending downwardly of the drain outlet whereby the cylindrical plastic pipes define first and second sump portions, and the first and second coils are predominantly submerged in the first and second sump portions. In still another feature, there is, in combination, the heat recovery apparatus and a water heater. The fresh water flow path of the grey water heat recovery apparatus is upstream of the water heater. The water heater has supply conduits to at least a first hot water load, and the grey water flow path of the heat recovery apparatus receives grey water from at least the first hot water load.

In another feature, the apparatus includes a space filling member positioned to reduce flow path area of the grey water. In a further feature, the apparatus includes at least one return. The return is mounted within an obstructing member. The grey water is restricted to flow in an annular region outside the obstructing member. In another feature, the apparatus includes a tube bundle. The tube bundle has an outlet and an inlet. Both the outlet and the inlet are located at one end of the tube bundle whereby the tube bundle may be extracted from one end of the apparatus as a single modular unit. In an additional further feature, the tube bundle includes an inlet header, a return header, an array of feeder tubes extending between the inlet and return headers, and a return. The inlet header is mounted concentrically about the return, said return passing though said inlet header.

In another aspect of the invention, there is a grey water heat recovery apparatus in which to transfer heat between a grey water stream and a fresh water stream. The grey water heat recovery apparatus has a heat exchanger that has a first pass and a second pass, the first pass and the second pass is connected in series. The heat exchanger has a first side defining a grey water flow path, and a second side defining a fresh-water flow path. The grey water and fresh water paths are segregated from each other. The grey water flow path is a gravity-feed flow path. The fresh water flow path is a pressure-feed flow path. The heat exchanger has a grey water flow path inlet and a grey water flow path outlet. At least a portion of one of the first pass and the second pass is lower than the grey water flow outlet whereby the heat exchanger defines at least a first grey water sump. At least one of the first pass and the second pass including a first cylindrical pipe member through which to conduct the grey water stream, the first cylindrical pipe member defining a containment wall of at least a portion of the grey water flow path. The first cylindrical pipe member has a grey water inlet and a grey water outlet. The first cylindrical pipe member has a first end, and a first end member, the first end member defining a closure of the first end of the first cylindrical pipe member. A first fresh water flow element is nested within the first cylindrical pipe member. The first fresh water flow element extends axially within the first cylindrical pipe member. The first fresh water flow element has an inlet and an outlet. Both the fresh water inlet and the fresh water outlet are mounted to pass through the first end member of the first cylindrical pipe member.

In a feature of that aspect of the invention, the first fresh water flow element includes a metal coil. The metal coil has a return leg. The fresh water flow element has first and second end connections. Both of the first and second end connections of the metal coil pass through the first end of the first cylindrical pipe member. In another feature, the first and second cylindrical pipe members are mounted together side-by-side, and are mounted adjacent to a water heater. The water heater has an overall height, and the heat recovery apparatus has an overall height. The overall height of the heat recovery apparatus is in the range of ⅔ to ½ of the height of the water heater. In a further feature, one of: (a) the first pass and the second pass are connected to define a single grey water sump in which the grey water outlet of the first pass is connected to a lower portion grey water entry of the second pass; and (b) the first pass and the second pass are connected to define a first grey water sump in the first pass and a second grey water sump in the second pass, in which the outlet of the first sump is carried to a top portion entry into the second sump. In another feature, there is the heat recovery apparatus in combination with a water heater. The grey water heat recovery apparatus is connected as a fresh water pre-heater for the water heater.

In another aspect of the invention there is a grey water heat recovery heat exchanger. It has a first cylindrical plastic pipe for grey water with a first metal coil for fresh water nested therein. It also has a second cylindrical plastic pipe for grey water with a second metal coil for fresh water nested therein. The first cylindrical plastic pipe has an inlet for grey water. The second cylindrical plastic pipe has an outlet for grey water. The first and second cylindrical plastic pipes are connected in series to conduct grey water from the first cylindrical plastic pipe to the second cylindrical plastic pipe. The first metal coil is connected in series with the second metal coil. The second metal coil has a fresh water inlet. The first metal coil has a fresh water outlet. The fresh water coils are mounted for counter-flow operation relative to the grey water conducting first and second cylindrical plastic pipes. At least one of the first and second cylindrical plastic pipes defining at least a portion of a grey water sump in which at least a portion of the first and second metal coils is mounted.

In a feature of that aspect of the invention, at least one of the first and second cylindrical plastic pipes has a first end closure, and the corresponding one of the first and second coils has first and second end portions that pass through the first end closure. In another feature, the first and second cylindrical plastic pipes are in a predominantly upstanding orientation, and the grey water outlet of the second cylindrical plastic pipe is higher than a predominant portion of at least one of the first and second fresh water coils. In still another feature, the first and second cylindrical plastic pipes stand on a common base and are mounted together in a single mounting with both of the first and second cylindrical plastic pipes is in an upstanding orientation. The first cylindrical plastic pipe has a first end and a second end. The first end is higher than the second end. The second end of the first cylindrical plastic pipe has a blind closure. The first end of the first cylindrical plastic pipe has a closure has first and second penetrations through which pass respective first and second ends of the first fresh water coil. The first and second penetrations are higher than the grey water outlet of the second cylindrical plastic pipe. The first fresh water coil has a helical coil portion and a return leg portion. The helical coil has an outside diameter fitting within the first cylindrical plastic pipe to permit construction of the heat exchanger by axial insertion of the helical coil into the first cylindrical plastic pipe. The second cylindrical plastic pipe has a first end and a second end. The first end is higher than the second end. The second end of the second cylindrical plastic pipe has a blind closure. The first end of the second cylindrical plastic pipe has a closure has first and second penetrations through which pass respective first and second ends of the second fresh water coil. The first and second penetrations are higher than the grey water outlet of the second cylindrical plastic pipe. The second fresh water coil has a helical coil portion and a return leg portion. The helical coil has an outside diameter fitting within the second cylindrical plastic pipe to permit construction of the heat exchanger by axial insertion of the helical coil into the second cylindrical plastic pipe.

In another feature, there is the grey water heat recovery assembly in combination with a grey water drainage system, a water heater, and a hot water distribution system. The fresh water inlet of the heat exchanger is connected to a fresh water supply system downstream of a water meter. The fresh water outlet of the heat exchanger is connected to an inlet of the water heater. The water heater has an outlet connected to supply water to at least one of a hot water tap, a shower, a bath-tub, a clothes washer, and a dishwasher. The grey water drainage system is connected to a drain of at least one of a sink; a shower, a bath-tub, a clothes washer, and a dishwasher. The grey water drainage system is segregated from any sewage water system. The grey water drainage system is connected to the grey water inlet of the first cylindrical plastic pipe. The grey water drainage system includes an overflow bypass of the heat exchanger. There is a grey water inlet filter mounted to intercept objects in the grey water carried by the grey water drainage system to the heat exchanger. The outlet of the second cylindrical plastic pipe drains into a sewage drain.

In another feature of any of the foregoing aspects, the apparatus is enclosed in a unitary cylindrical housing in which both of the first and second (and any other) stages are enclosed. Externally accessible grey water and fresh water connection fittings pass through the external cylindrical housing. The fresh water connection fitting extends through a top end of the cylindrical housing. The grey water connection fittings extend through a sidewall of the cylindrical housing.

BRIEF DESCRIPTION OF THE ILLUSTRATIONS

These and other features and aspects of the invention may be explained and understood with the aid of the accompanying illustrations, in which:

FIG. 11b shows an enlarged fore-shortened sectional detail of the embodiment of FIG. 11a;

FIG. 11c is a sectional view of a manifold of the embodiment of FIG. 11a; and

FIG. 11d is a side view of a heat exchange bundle module of the embodiment of FIG. 11a.

FIG. 12b is a sectioned, vertically foreshortened view of the embodiment of FIG. 12a;

FIG. 12c is a sectioned view looking downward and showing the pipe arrangement of the embodiment of FIG. 12a;

FIG. 12d shows a top view of the embodiment of FIG. 12a;

FIG. 13 shows a vertically foreshortened cross-section of a further alternative embodiment to that if FIG. 12a.

DETAILED DESCRIPTION

Figure 1:
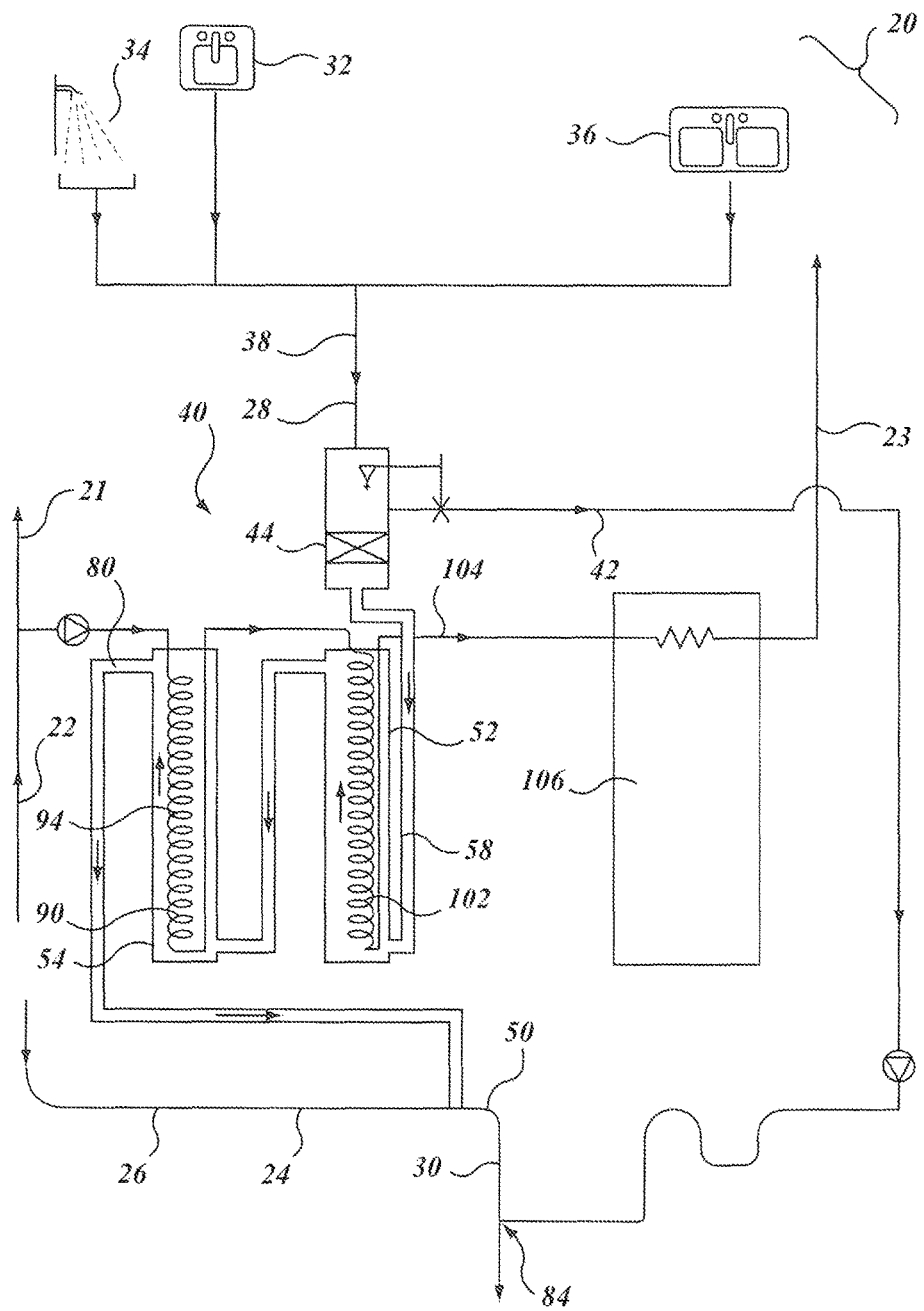
FIG. 1 is a conceptual schematic view of a building, such as a residence, having grey water sources.

The description that follows, and the embodiments described therein, are provided by way of illustration of an example, or examples, of particular embodiments incorporating one or more of the principles, aspects and features of the invention. These examples are provided for the purposes of explanation, and not of limitation, of those principles, aspects and features. In the description, like parts are marked throughout the specification and the drawings with the same respective reference numerals. The drawings may be taken as being to scale, or generally proportionate, unless indicated otherwise. In the cross-sections, the relative thicknesses of the materials may not be to scale.

The scope of the invention herein is defined by the claims. Though the claims are supported by the description, they are not limited to any particular example or embodiment. Other than as indicated in the claims, the claims are not limited to apparatus or processes having all of the features of any one apparatus or process described below, or to features common to multiple or all of the apparatus described below. It is possible that an apparatus, feature, or process described below is not an embodiment of any claimed invention.

The terminology used in this specification is thought to be consistent with the customary and ordinary meanings of those terms as they would be understood by a person of ordinary skill in the art in North America. The Applicant expressly excludes all interpretations of terminology that are inconsistent with this specification, and, in particular, expressly excludes interpretation of the claims or the language used in this specification such as may be made in the USPTO, or in any other Patent Office, other than those interpretations for which express support can be demonstrated in this specification or in objective evidence of record, demonstrating how the terms are used and understood by persons of ordinary skill in the art generally, or by way of expert evidence of a person of experience in the art.

In this discussion it may be helpful to make reference to a gravity based co-ordinate system. That is, in flow systems generally, there is a source or inlet of flow, and an outlet or discharge of flow. Fluid moves from a location of higher pressure or potential to a location of lower pressure or potential. In a fresh water supply system, the source of pressure may be a pump or an accumulator, such as a water tower, that may be used to provide or maintain a desired system head or pressure. A drain system, whether for sewage or for grey water, may be a gravity fed or gravity driven system in which the head of the flow, if any, is determined by the height of the water column of the drain. Such a system may be considered a low, or very low, head system. In either case, the system will have an upstream direction from which flow originates, and a downstream direction toward which flow occurs. In the context of the present description, gravity flow systems also include septic or other systems where the material that collects in the drainage system under the influence of gravity is then pumped out, such as, for example, to a holding tank or to a septic bed. The drainage system upstream of the septic pump is a gravity flow system within the meaning herein, even though there may be provision to pump out the downstream end or collector, or sump of the system. In such systems, there may be a separate grey water sump and grey water pump to raise the effluent to a level to reach the holding tank or to flow into the septic bed, as may be.

In this description there are cylindrical objects. In such circumstances it may be appropriate to consider a cylindrical polar co-ordinate system in which the axis of rotation of the body of rotation, or cylinder, as may be, may be considered the axial or x-direction. The perpendicular distance from the x-axis is defined as the radial direction or r-axis, and the angular displacement is the circumferential direction, in which angular distance may be measured as an angle of arc from a datum. The commonly used engineering terms "proud", "flush" and "shy" may be used herein to denote items that, respectively, protrude beyond an adjacent element, are level with an adjacent element, or do not extend as far as an adjacent element, the terms corresponding conceptually to the conditions of "greater than", "equal to" and "less than".

Figure 2:
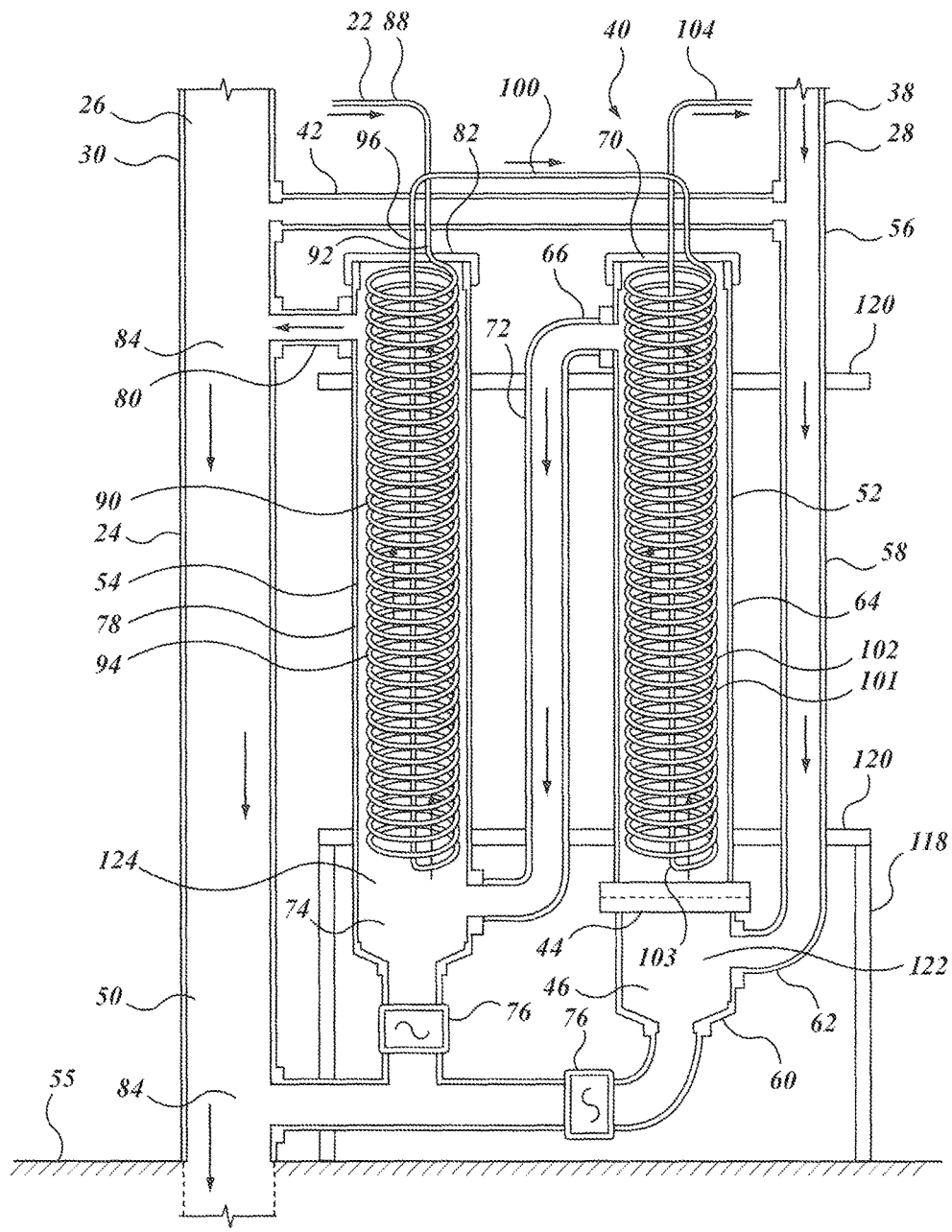
FIG. 2 is a cross-sectional view of an example of a heat exchanger arrangement according to an aspect of the invention.

Considering FIGS. 1 and 2, there is a building 20. Building 20 may be a residential dwelling, whether a single family home, or multiple unit residence, as may be. It may be a school or office building. However it may be, building 20 may have a water supply system 22, and a drain system 24. Water supply system 22 may include a fresh, cold water supply system, 21, and a fresh hot water supply system 23, such as may be fed from a water heater. Drain system 24 may include a septic or sewer system 26, and may include a grey water system 28. Grey water system 28 is segregated from septic or sewer system 26. Septic or sewer system 26 may be connected to toilets and utility room floor drains, for example, and may have drainage runs, or pipes, that collect at a common manifold, or drain, or riser or stack, indicated generally as 30. In either case, building 20 may have a mechanical or utility room, typically in a basement, or at foundation level.

Grey water system 28 may include one or more sink drains, whether from a washroom sink, or from a kitchen sink, or laundry tub, generically indicated as sink 32; from one or more shower drains, indicated generically as 34; from a kitchen sink or dishwasher drain, indicated generically as 36. These drains connect to a common grey water drain line or manifold, such as may be indicated as 38. Manifold 38 feeds a heat recovery apparatus 40. That is, the gravity driven grey water output or discharge flow of manifold 38 is the grey water input flow of heat recovery apparatus 40.

In the example of FIG. 2, heat recovery apparatus 40 may include an overflow bypass 42 that is connected to conduct flow arriving from manifold 38 to the main drain 50 in the event that some or all of the grey water input flow does not flow into the heat exchange components of apparatus 40, for whatever reason. Heat recovery apparatus 40 may also include an input filter, or filters, indicated as 44, to exclude solid particles or other objects whose presence or accumulation within the heat exchange elements of apparatus 40 may not be desired. The inlet filter may be placed so that the inflow into unit 40 passes partially or predominantly upward, whereby objects that might otherwise tend to accumulate on the filter element may, when the flow relents or ceases, tend to fall downward, or settle, under the influence of gravity and collect in a cleanout, such as suggested at 46, and such as may be emptied from time to time by an operator as a part of maintenance. The element, or elements, of filter 44 may also be removed, cleaned, or replaced from time to time. Ordinary flushing of cleanout 46 may be controlled by a valve 76 mounted to the cleanout sump drain outlet. The output of valve 76 leads to main drain 50. Main drain 50 carries effluent below the level of the foundation, or basement floor 55, either to the municipal sewers, or to a septic tank or bed, with or without an intervening pump-out pump as may be.

In the example of FIG. 2, heat recovery apparatus 40 includes a first stage, or pass, 52, and a second stage or pass, 54. Heat recovery apparatus 40 may be considered as a heat exchanger (or series of connected heat exchangers), in which each pass 52 or 54 (or more, as may be) is itself a heat exchanger. The stages or passes are connected in series, and in the embodiments of FIGS. 2 and 3 the inputs and outputs on the hot and cold sides, respectively, are connected in opposite directions, such that heat recovery apparatus 40 is a counter-flow heat exchanger.

Figure 4:
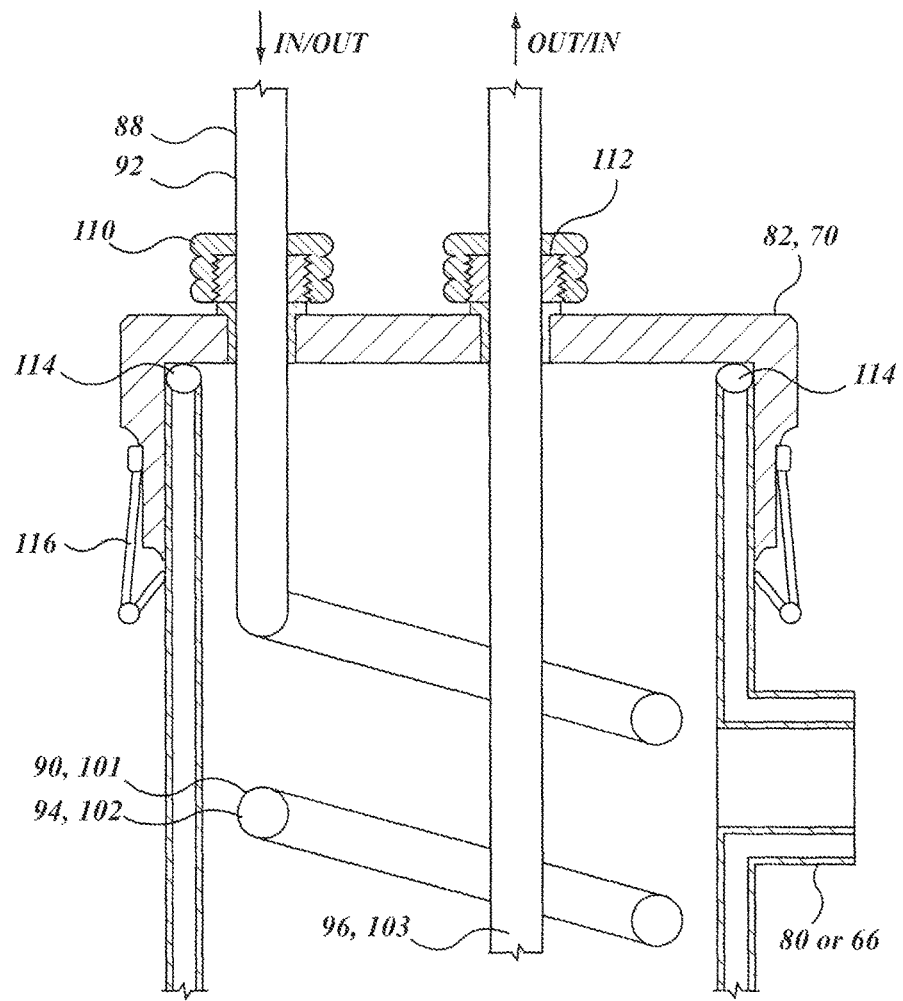
FIG. 4 is a cross-sectional view of a cap assembly of the heat exchanger arrangement of FIG. 2.

In FIG. 2, following the grey water, which is presumed to be the hot side flow (that is, the incoming grey water is assumed to be warmer than the incoming fresh water supply), main grey water drain line 38 arrives at a tee 56 to which overflow bypass 42 is connected. The straight-through output line defines the infeed pipe 58 to first pass 52. It is connected to bottom union 60 at an elbow 62 that is teed into first pass 52 below filter 44. The main body of first pass 52 may be formed of a round cylindrical pipe 64 that defines the outer shell of the unit. Pipe 64 may be made of any suitable drain piping material, and may, if desired, be externally insulated. In one example pipe 64 may be PVC or ABS or metal pipe. Pipe 64 may tend to have a length that is an order of magnitude, or more, greater than its diameter. In one example pipe 64 may be an ABS pipe of nominal 4 inches in diameter (i.e., the inside wall defines a 4 inch (roughly 10 cm) diameter passageway). Other sizes may be used. In one embodiment the pipe may have a nominal 6" (roughly 15 cm) internal diameter. Infeed pipe 58 (and all of the other grey water piping discussed herein) may likewise be any kind of pipe suitable for drain installations, and may typically be a plastic or reinforced plastic pipe, be it ABS, PVC or some other. To the extent that heat transfer through the outer wall is not desired, pipe 64 may tend not to be made of copper, or may be externally insulated, or both. The bottom end of pipe 64 is closed off. In the embodiment shown, the end closure fitting of the closed end is closed by a valve 76. Valve 76 may be opened when it is desired to flush out the clean out at the bottom of the sump. In normal operation valve 76 will be closed. At the far end of pipe 64 there is an off-take or outlet, which may be a tap or tee in the sidewall as at 66, defining the grey-water outlet or discharge of first pass 52. The uppermost end, pipe 64 is closed by another end closure or end closure fitting such as a cap or plug fitting, 70, shown in cross-section in FIG. 4, and described in greater detail below.

A transfer tube or pipe 72 extends from outlet 66 of first stage 52 to the inlet of second stage 54. Again, the inlet pipe is teed into the base of second stage 54 at the bottom, or lower portion, where there is a flushing or clean-out drain 74 controlled by a valve 76. Second stage 54 similarly has a main body that may be formed of a cylindrical pipe 78, typically of the same diameter and material as that of first stage 52, with an outlet or off-take, or discharge as at 80, and an end plug or cap or on end closure or end closure fitting as at 82. The outlet or discharge of second stage 54, being the outlet of grey water from heat recovery apparatus 40 more generally, is connected to drain into main drain 50. That is, the grey water and septic water systems are segregated upstream, but drain into a common flow at the outlet juncture, at 84. The grey water path may be considered to be the hot side, or hot path, of the heat exchanger, from which heat is extracted.

The other side of the heat exchanger, typically termed the cold side or cold path, is designated generally as 90. It is the side of the heat exchanger to which heat is transferred or rejected. The cold side may typically provide a flow for inlet water under pressure, typically 30-50 psig of a municipal fresh water supply. Inasmuch as the fresh water may typically enter from buried pipe, the cold water temperature may often be in the range of 40-50 F. The cold water pipe, being a pipe under pressure, may typically be a copper pipe, although stainless steel or any other suitable pressure line pipe may also be used.

The cold water supply, after having passed through the water meter, may have a tee at which one side is directed to the cold water outlets in the building, and another side through which fresh water flow is directed to the hot water distribution. As shown in FIG. 2, the hot water heater distribution feeder line 88 enters the second pass at an inlet 92 in cap or plug 82. The cold water supply may then have a heat exchange element 94 that is mounted to plug 82. The element may have many different forms, and may include finned heat exchange members. However, as shown, element 94 may have the form of a coil. The coil may have more than one pipe, and may include twinned pipes coiled in an axially side-by-side helix of nested helices, as in the embodiment of FIGS. 10*a* and 10*b*, for example, or in nested helices of different radii. The coils may not be circular in cross-section, but may be flattened or oval, to form a more ribbon-like section having smaller hydraulic diameter than a circular section. The coil may be a single coil of copper pipe of constant diameter and circular section, coiled on a constant radius and having regular axial pitch between the turns of the coil. At the lower end of the coil, the run in the other direction, such as may be called the "return" leg, may be a straight leg running axially or predominantly axially relative to cylindrical pipe 78, and may be a substantially straight leg 96, that also passes through cap or plug 82 to its end or termination, or outlet connection, be it a coupling, union, adapter, or other pipe fitting. The return leg 96 may run within the helix of the coiled portion, and need not be centered in the coil, but may be offset from center. The straight leg portion may be referred to as the "return" leg, although the flow may be in the opposite direction according to the manner of connecting the inlet and outlet pipe connections of element 94 (or element 102 as below). The use of the "return" terminology in this sense is intended not as an indication of internal flow direction, but rather of providing a line of shorter path length back to roughly the same entrance location as the other, coiled leg, whichever of the two may be the "inlet" or "outlet". To avoid confusion, the term "counter-direction leg" may be used in place of "return leg" The use and installation of such fittings are thought to be well understood by persons of skill in the art. It is assumed in this description that heat transfer between the fresh water and the grey water occurs predominantly in the coiled portion of the coil, 94, rather than in the straight leg 96.

The cold water pipe leaving second stage 54 then passes through a transfer tube or pipe 100 to first pass or stage 52. The fresh water heat exchange element 102 in first pass 52 may be different from that in second pass 54, in the general case, but may typically be the same as heat exchange element 94, and may be a helical copper coil. Again, heat exchange element 102 may have a coiled portion 101, and a straight leg portion 103. The straight leg portion may be referred to as the return leg, although the flow may be in the opposite direction according to the manner of connecting the inlet and outlet pipe connections of element 102 (or element 94 as above). Again, it is thought that heat transfer occurs predominantly between the coiled portion 101 and the grey water, much more so than as between the straight leg portion 103 and the grey water. To the extent that it may be desired to reduce heat transfer from the straight leg portion, it may be insulated. For the ranges of temperatures, and the temperature differentials, under consideration, the undesired heat transfer in the straight leg portion may be relatively small, and it may in some embodiments be used without insulation.

The outlet fresh water pipe from first pass 52 may then be carried through (i.e., connected to) piping 104 to the inlet of a domestic hot water heater 106, such that apparatus 40 functions as a pre-heater in the hot water side of the fresh water system. The hot water pipes leaving water heater 106 feed the various hot-water taps or connections in the building, such as the sinks, showers, clothes washing machine, dishwasher, and so on. The grey water system may then provide the drain, or drains, fir these elements, and the heat subsequently extracted from the grey water is used to pre-heat incoming fresh water.

Figure 3:
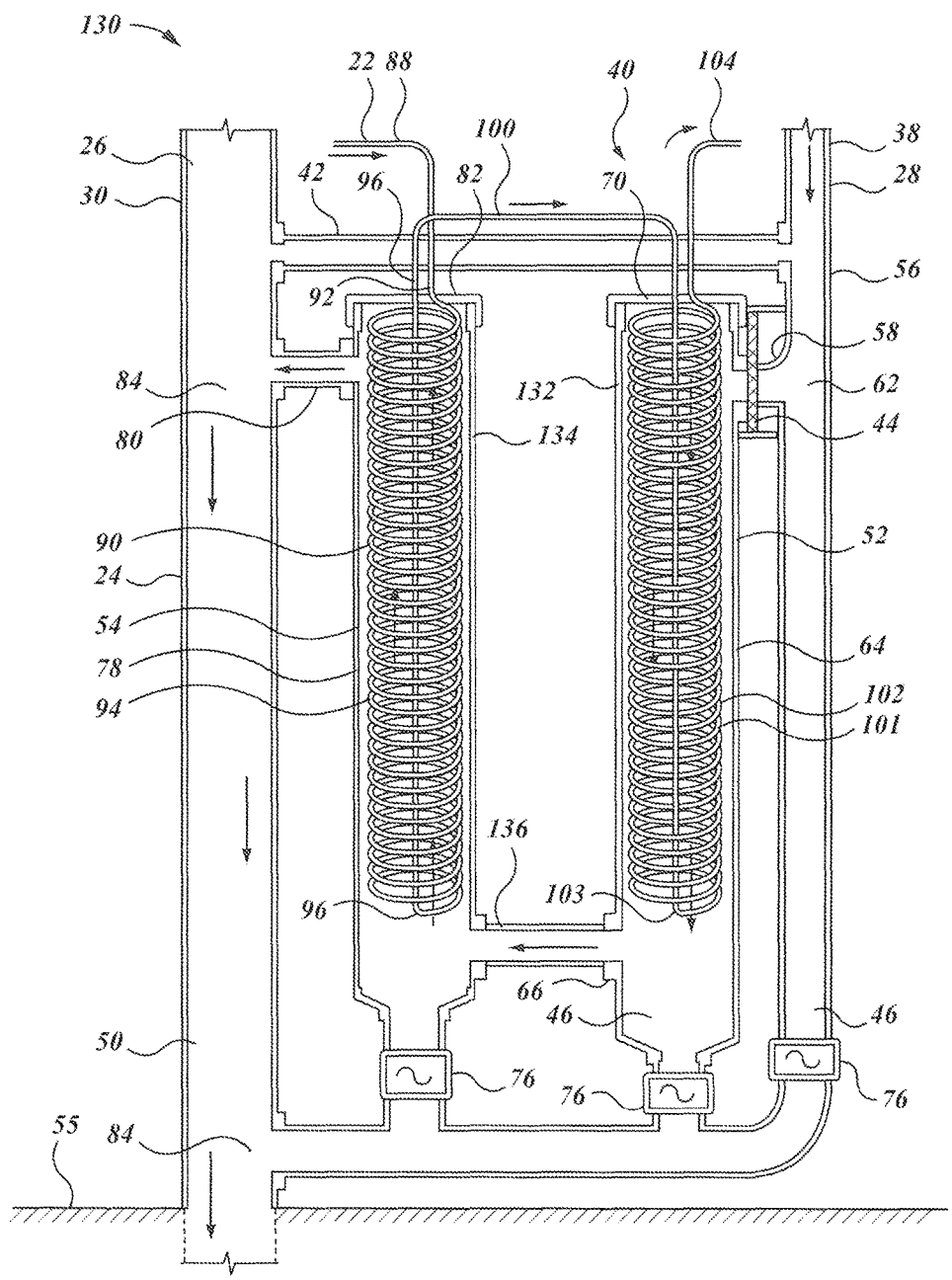
FIG. 3 is a cross-sectional view of an alternate embodiment of heat exchanger arrangement to that of FIG. 2.

As may be noted, in the embodiments of FIGS. 2 and 3, the connections of the transfer lines 100 of the fresh water to be pre-heated are such that the overall direction of travel of the water in the coiled section, be it 94 or 102, is opposite to the direction of travel of the grey water in the corresponding cylindrical pipe, be it 64 or 78. That is, where the coil carries the fresh water upwards, the grey water is moving downward. Conversely, where the coil carries the fresh water upward, the grey water flows downward. In the embodiment shown, the heat exchange coils of the fresh water side of the unit may penetrate the end caps at compression fittings, indicated as 110, 112 in FIG. 4. A seal, such as an O-ring 114 may be mounted to the top end of cylindrical pipe 78 (or 64). Cap 82 (or 70, as may be) seats on O-ring 114, and is held in place by a releasable securement, such as a clamp 116. Release of clamp 116 permits insertion or extraction of coil element 94 (or 102) in the axial direction, 'B'. In other embodiments, rather than using clamp 116, a threaded fitting may be used.

The entrance and exit of the fresh water lines to each of the heat exchange passes is above the level of the outlet drain 80 of apparatus 40. That is, even when the grey water inflow is not flowing, and the unit is passive, the water level may be expected to be at the level of the lower lip of outlet 80. As such, the dominant portion, or substantially all, or all, of the coil or coils of the coiled portion 94 (or 102, as may be) may tend to remain immersed even when the grey water is not flowing. In that sense, cylindrical pipes 64 and 78 may be considered to be, or to define, a sump or series of sumps, or collectors 122, 124, one leading to the next, in those portions lower than the outlet overflow, e.g., that of outlet 80 or 66 as may be. That is, where outlet 66 is higher than outlet 80, the resting fluid level, or resting water level, "RWL", in sump 122 will be governed by the height of outlet 66, and the resting height of fluid in sump 124 will be governed by the height of outlet 80. Where outlet 66 is lower than outlet 80, the resting fluid level of both sumps, or sump portions, 122, 124 will be governed by the height of the height of outlet 80.

In the alternate assembly of FIG. 3, apparatus 130 is substantially the same as apparatus 40, except that the grey water inlet of first stage 132 is at, or near, the top thereof and the transfer to second stage 134 occurs at a low level, as at transfer pipe 136 located below the coils and just above clean-out 46. The connections of the fresh water system are again such as to cause the inlet fresh water in the coiled portion to flow in the opposite direction of the grey water as the fresh water advances through the turns of the coil. In this embodiment, the height of transfer pipe 136 is well below outlet 80, so the resting grey water fluid level in both sumps is governed by the level of outlet 80. In this context, there may be considered to be two sump portions (corresponding to passes 132 and 134) of a single sump.

In the normal course of operation, fresh water is only admitted to water heater 106 (and hence to apparatus 40 or 130) when a hot water tap is opened in the building.

Customarily, that water is then drained, possibly with some time delay (after the dishes are washed, the clothes washer fills and drains, or the bathtub or sink is emptied). The drained grey water, which may be warm (up to 60 C=140 F for dishwashers and clothes washers; perhaps up to 45 C=110 F for sinks, bath-tubs, and showers) as compared to ambient indoor temperature (20-25 C=68-80 F) in the building, is then the drainage inflow that displaces the grey water previously collected in the sump of the first and second stages of apparatus 40.

Figure 5:
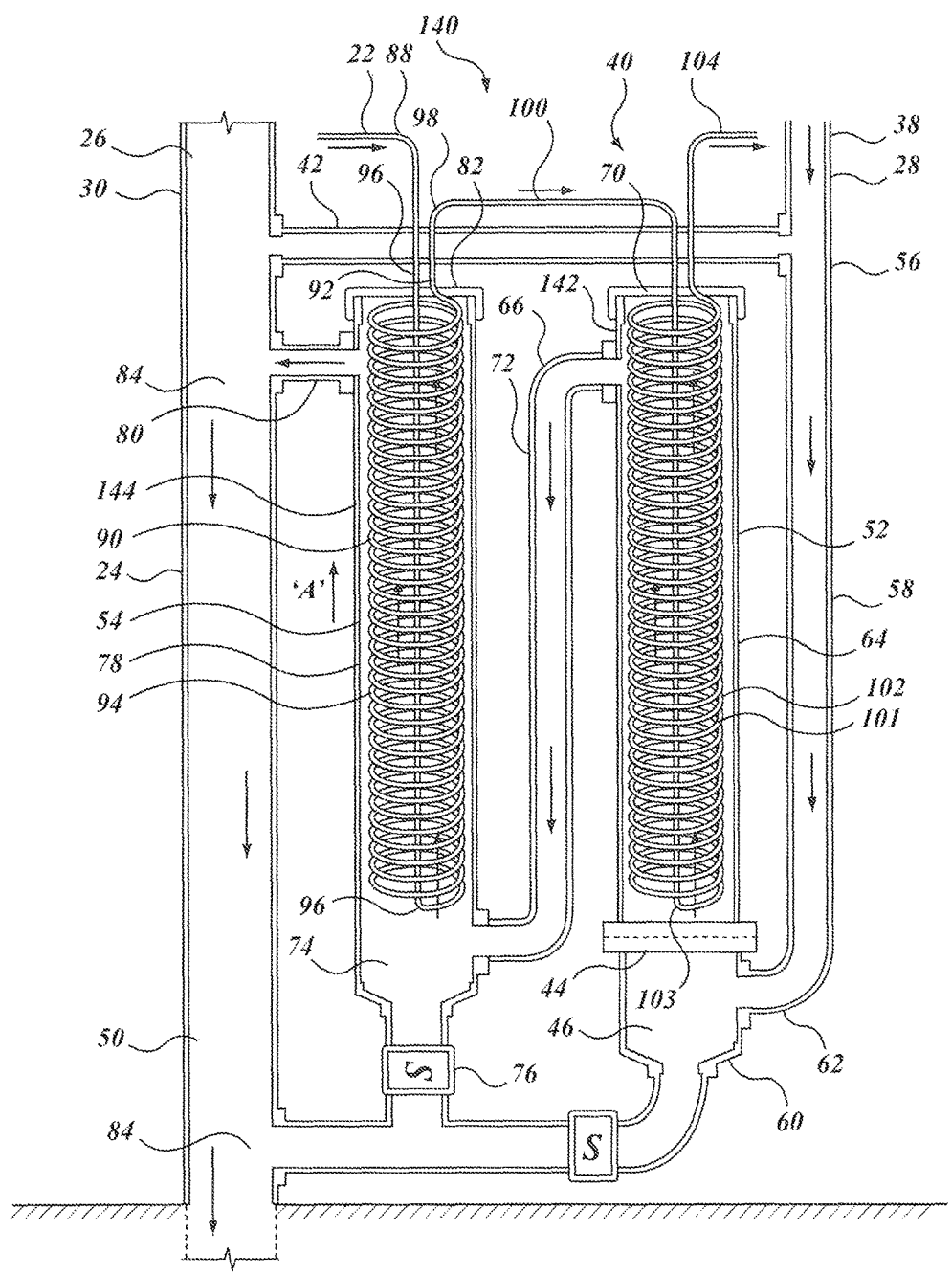
FIG. 5 is an alternate arrangement to that of FIG. 2.
Figure 6:
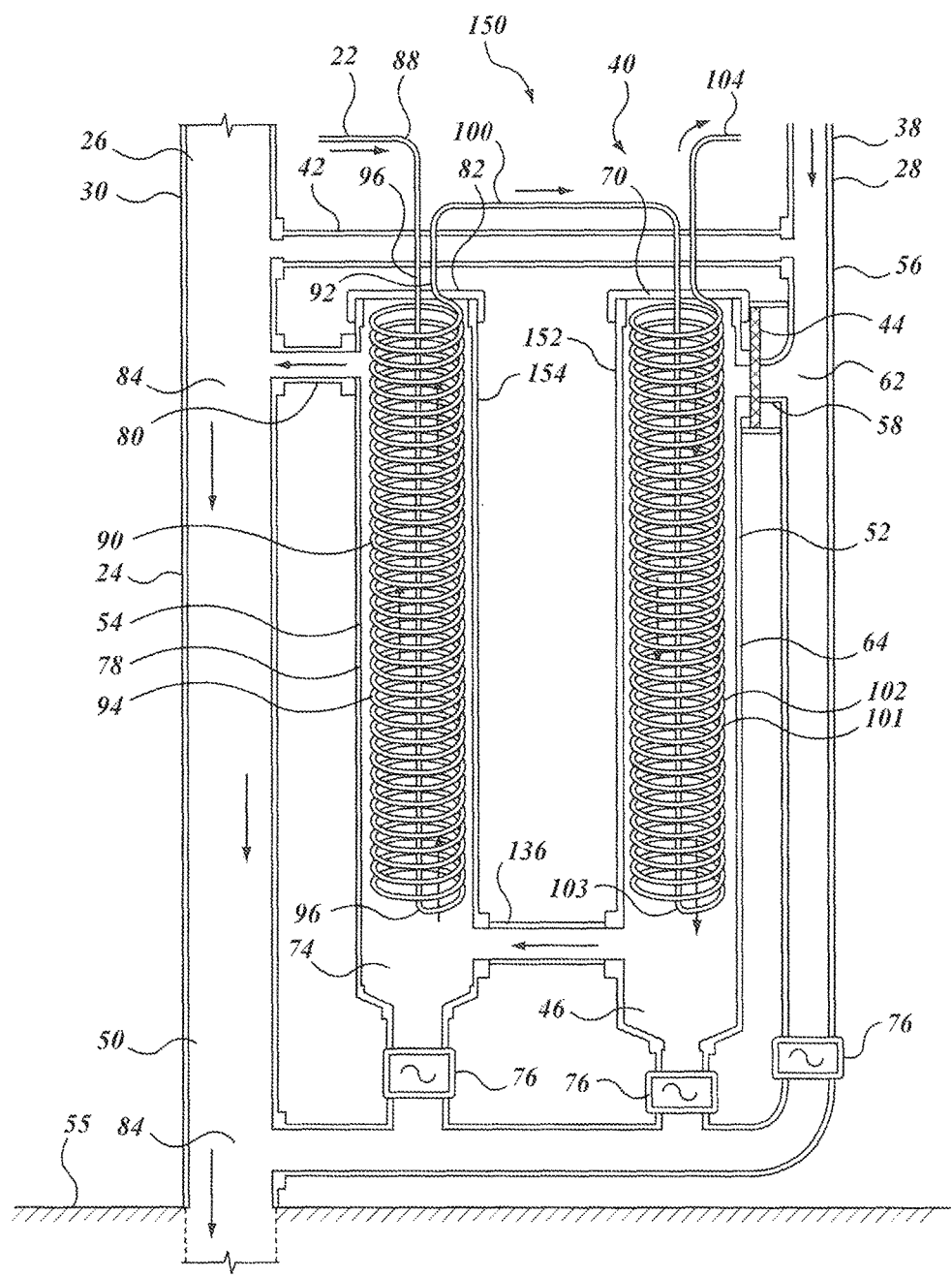
FIG. 6 is an alternate arrangement to that of FIG. 3.

Although full counter flow embodiments are shown in FIGS. 2 and 3, alternate embodiments are shown in FIGS. 5 and 6. In contrast to the embodiments of FIGS. 2 and 3, in the embodiment of FIG. 5 the connections of the coils are such that in apparatus 140 the axial direction 'A' of flow in the helical portion of the coil as a whole (as opposed to the tangential direction flow at any point in any particular turn of the coil) is substantially the same as the direction of flow of the grey water in both first stage 142 and second stage 144. In FIG. 6, in apparatus 150 the direction of flow in first stage 152 is counter to the axial direction of flow in the fresh water coil, whereas the direction of flow in second stage 154 is in the opposite direction. The advantage of a system such as that of FIG. 6 is that the fresh-water inlets and fresh outlets are consistent, which may avoid confusion on installation. That is, in this embodiment, the inlet is always the center line, and the outlet is always the radially outward line, whether it is for the first stage of the heat exchanger or for the second stage.

Figure 7:
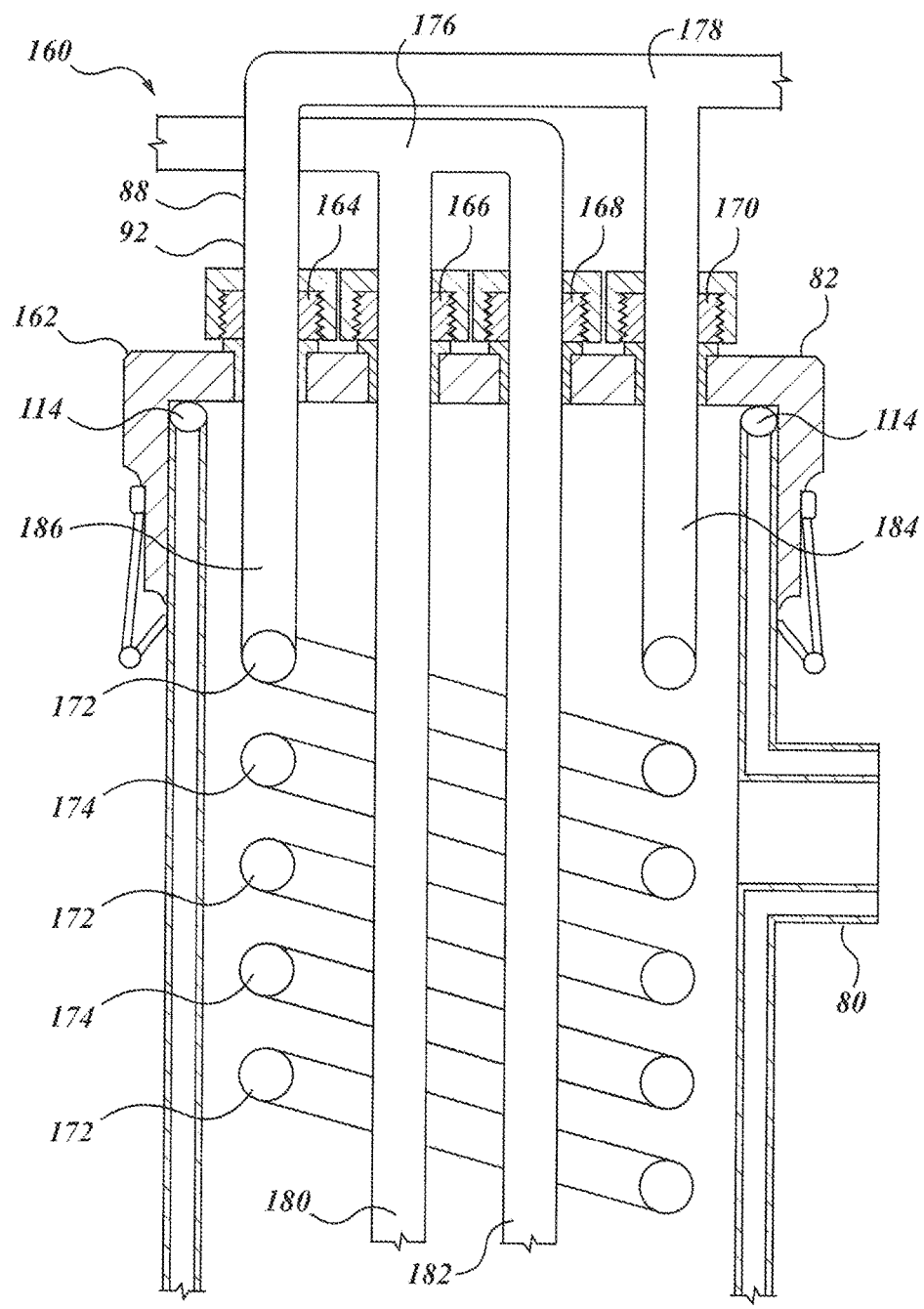
FIG. 7 shows a partial view in section of a double-helical alternate arrangement to that of FIG. 2.

In the embodiment of FIG. 7, apparatus 160 employs a double-helical coil, in which cap 162 has four penetrations and compression fittings, as at 164, 166, 168, 170 and two nested coils 172, 174. Coils 172, 174 may be on 180 degree centers, i.e., rotated half a turn relative to each other. Coils 172, 174 may be joined in parallel at their respective ends by tees 176, 178 on their respective inlets 180, 182 and outlets 184, 186. The designation "inlet" and "outlet" is arbitrary, and depends on the direction of the flows as the apparatus is installed. The provision of doubled coils may tend to increase the heat transfer surface area between the fresh water flow and the grey water flow, may also tend to increase the time (on average, double) that the fresh water fluid takes to traverse the heat exchanger stages; and, to the extent that multiple flow channels may have a greater total cross-sectional area than a single flow channel, may also tend to reduce the flow resistance in the heat exchanger. Doubled coils may be used in any of the foregoing embodiments. It is also possible to have more than two coils—there may be three or four. Although it is assumed that each coil member is circular in cross-section, they need not be. They could, for example, be oval or rectangular. It is not necessary that the coils have the same diameter or cross-sectional area as the inlet or outlet pipes—several parallel coils each of smaller diameter may in total have the same or greater cross-sectional area as the single inlet and outlet fresh water pipes. Whether one, two, or more, coils may be mounted in each heat exchanger stage, the adjacent coil turns may be held in spaced apart relationship in the axial direction of the outer cylindrical pipe (be it 64 or 78) by retainers, or spacers, or spiders, (not shown).

In the embodiments shown, the pressurized fresh water lines do not require radial penetrations of the cylinder side wall. Rather, the junction is in the end closure fitting or end plug, or cap, or closure, or closure member. A plug could also be installed in a side wall of the unit. The use of a standard fitting or cap, or plug, permits a known mating between the plug and the seat of the cylinder, which is a known mating technology, of wide availability, and of understood simplicity and reliability. It is a known technology, that is used also at the solid end or closure or plug that caps off the bottom end of the cylinder as well. In the embodiments of FIGS. 2, 3, 5 and 6, the bottom closure of each pass is governed by one or another of the clean out fittings, be it a drain fitting, or trap, or valve, 76. In operation, with the clean out fitting closed, the bottom closure may be considered as functionally equivalent to a blind end fitting or cap, or plug, i.e., without any fresh water line penetrations, as if it were a solid blank or cap through which flow does not occur. Flow only occurs through that end when the system is being flushed, e.g., to clean out debris. Where apparatus 40 is monitored or controlled by an electronic controller or timed or programmed device, the flushing or clean-out step may occur periodically, such as once a day, once a week, or once a month, and may occur at a time when it is not likely to affect operation, e.g., in the middle of the night. Given that cylinder 64 accommodates the heat exchange coil, cylinder 64 may be larger in diameter than the inlet, outlet, flushing, overflow, and other grey water flow pipes described. The coil can be pre-formed, mated with the pipe stems, and the pipe stem fittings mated to, or potted in, the end closure fitting or cap or plug. Installation (and removal or replacement, as may be) occurs by axial translation of the coil in the cylinder. In one embodiment the pipe may be ABS pipe. The pipe may be of nominal 5" dia, with a 5" inside diameter in which a helical coil (or coils) of 4" or 4½ outside diameter of coil copper pipe may be located. In another embodiment the pipe may be 6" nominal diameter, with a 6" inside diameter wall housing a 5" or 5½" diameter helical coil (or coils) may be installed. In each case, the first pass (or second pass, or third pass, etc.), and therefore the respective reservoir, or receptacle, sump or sump portion, has a shell wall defined by the pipe. Each of those cylinders, or passes or receptacles or sumps may tend to be elongate—that is, substantially longer in the axial direction than wide in terms of diameter. In general use these members may be upstanding, being upright or predominantly upright. In a tall thin reservoir or sump, the depth and volume of the sump tend to be large as compared to the surface area of the liquid in the sump. In one example, the hydraulic diameter of the resting liquid surface may be less than one tenth of the depth of the sump below the outlet.

The penetration of the closure fitting can be potted in an epoxy or other moulded compound to form a durable seal. As the fitting penetration is located above the level of the drain, and therefore above the resting fluid level in the sump, even if the fitting should be imperfect, or if it should loosen over time, it may tend not to result in leakage, and it may tend even then to be relatively easy to obtain access to the fitting for repair or replacement.

Further, in the embodiments shown, the cylinders may tend to be substantially longer than their diameter, such that the axial flow length is much longer than the diameter of the cylindrical pipe, e.g., 10 times the length, or more. In one installation, the overall height of the cylinder is between 4 ft and 7 ft, with a diameter of about 4 inches. That is, the height may be intended to fit within the clearance provided by an 8 ft ceiling, and may be approximately the same as, or comparable to, the height of a water heater, which may typically be about 5 ft, the size depending on whether the tank is nominally 30, 40, 50, or 60 gallons. It may be that the overall height of the heat exchanger apparatus may be in the range of ⅔ to ½ of the height of the adjacent water heater 106. Two adjacent cylinders may be held on a common base, 118, and may be spaced from each other by yokes or frame members 120. There may be three or four such cylinders held together in a bundle. Although such a bundle of pipes might be arranged with the long axis of the pipes oriented horizontally, and the outlet at a height to maintain a resting fluid level of grey water in the cylinders as sumps, it may be more convenient, and more compact in terms of floor space occupied, for the cylinder bundle to be arranged vertically, or substantially or predominantly vertically, or upright. The pre-heater heat exchange or heat recovery apparatus, 40, may be mounted beside the hot water heater, in a furnace or other utility room, for example, and may occupy a physical footprint of comparable size, or less.

Figure 8:
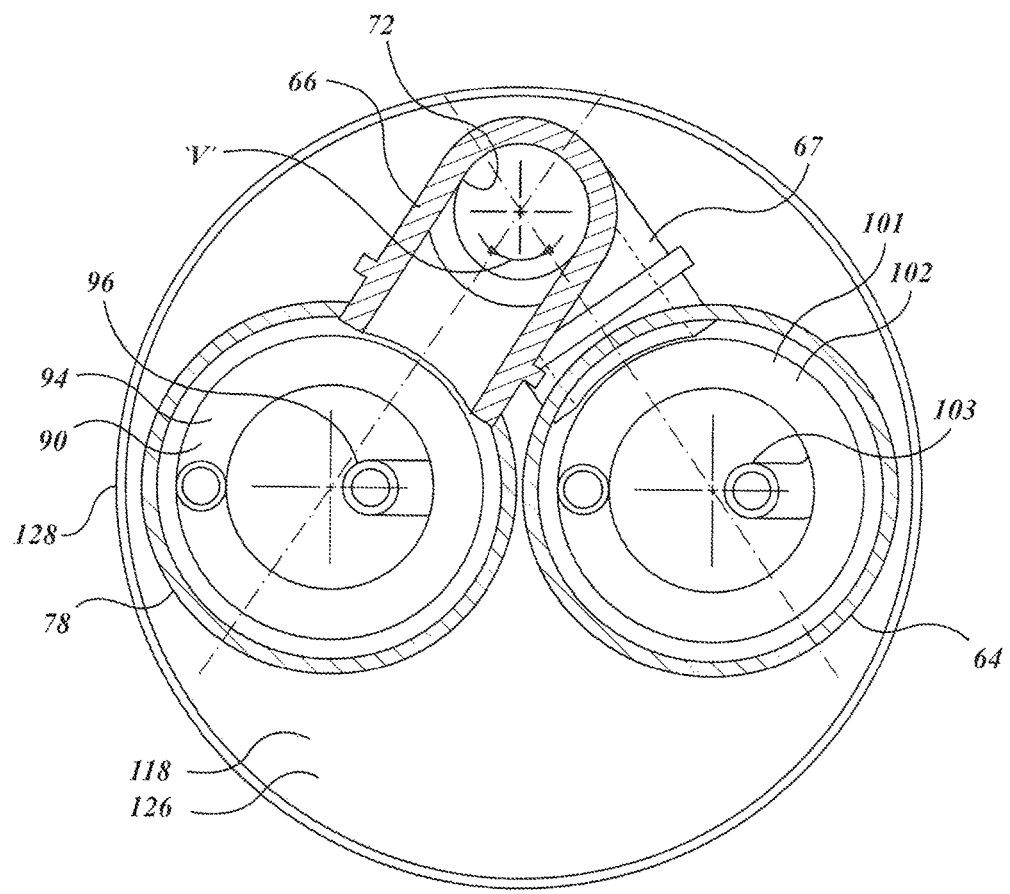
FIG. 8 shows a section, looking downward at the level of the upper outlet of one of the passes of a two-stage embodiment of heat exchanger such as in FIG. 2.

FIG. 8 shows a possible bundle arrangement in which the first and second pass cylinders 64 and 78 are placed tightly proximate to each other on a common base 118 (shown, in this instances, as being a round circular base, or plate 126) with inlet and outlet (or upper and lower) elbows 66, 67 angled on a V (when seen from above, the V being defined by the intersection of the lines of centers drawn, respectively, between the center of pipe 64 and the center of pipe 72; and between the center of pipe 78 and the center of pipe 72) such that transfer pipe 72 is nested close into the space between the two cylindrical pipes. As shown, pipe 72 may then lie within the smallest circle that circumscribes cylindrical pipes 64 and 78. In some embodiments, if a tangent line is drawn across the top edge of cylinders 64 and 78 closest to pipe 72, the proximate edge of transfer pipe 72 traverses that tangent such that the proximate edge is closer to the line of centers of pipes 64 and 78 than is the tangent line. There may be end closure plates 126 at top and bottom, and the entire assembly may be enclosed within a cylindrical shell or closure member, or skin, or housing, or cowling 128 that runs between the top and bottom members. The inlet pipe 58 and outlet pipe 80 may be mounted on the same side and parallel, as shown, for easy access and installation, or may be mounted on opposite sides, or on 90° spacing.

Figure 9:
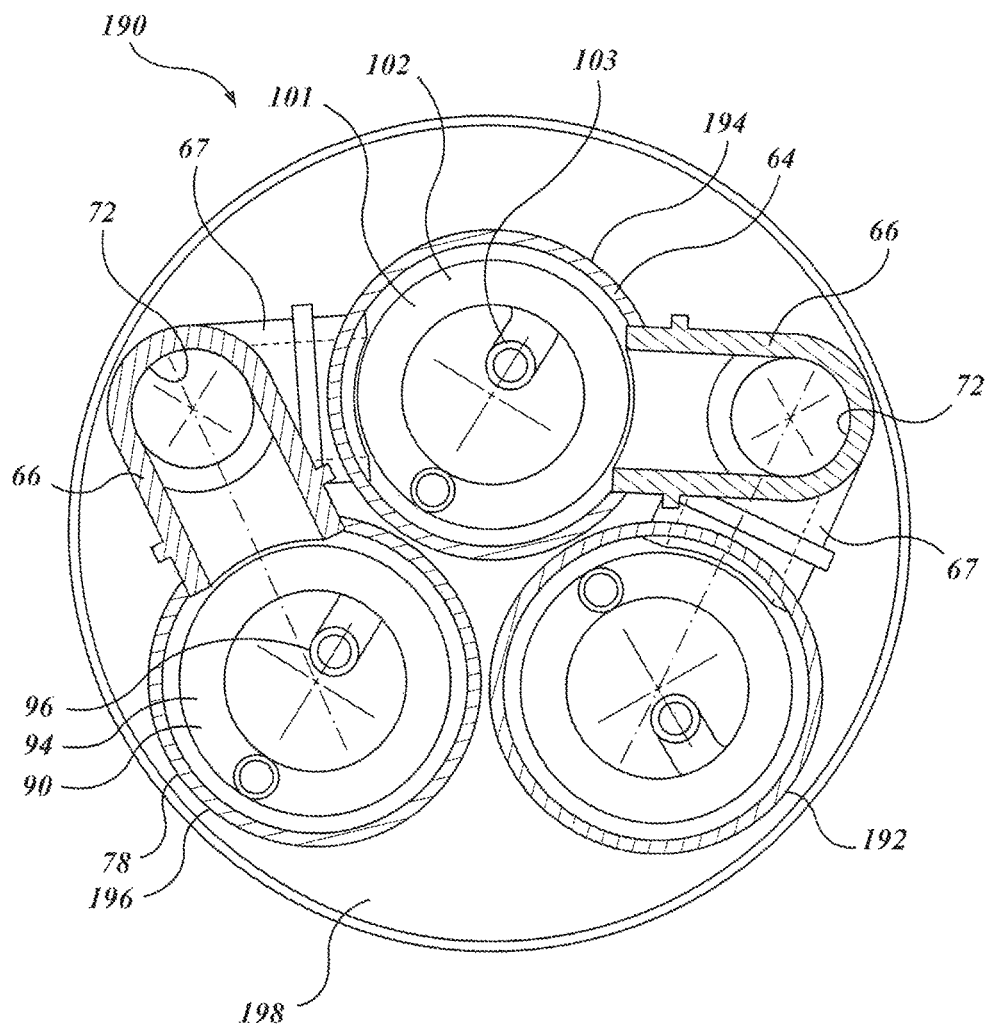
FIG. 9 shows a sectional view, analogous to the view of FIG. 8, looking downward, through a three-stage embodiment of heat exchanger.

FIG. 9 shows an alternate embodiment to that of FIG. 8, in which the heat exchanger arrangement or assembly 190 has more than two stages in series, as indicated by first second and third stages 192, 194 and 196. The stages are arranged in a generally counter-flow arrangement to the flow of waste water. These stages are substantially similar to those shown in FIG. 8, but there are three rather than two, mounted on a common base 198. All of the cylindrical members and transfer tubes of assembly 190 fall within the projected plan profile of base 198 as a single, tight bundle. Assembly 190 illustrates that the cylinders in the bundle need not have axes all lying in the same plane. In assembly 190, while the axes are mutually parallel and defining the vertices of a triangle, such that the pipes are mounted side-by-side in a triangular configuration. Base 198 may have the form of a round plate by which the other items are circumscribed. A more-than-two-stage heat exchanger may be used where, for example, the vertical clearance is more limited. It may be that rather than having an 8 ft or 9 ft ceiling, where a 6 ft or 7 ft tall heat exchanger assembly might be used, there may be only 48, 60 or 72 inches of vertical clearance. For the same length of heat exchange coil surface, three shorter coils may be used instead of two longer coils. Similarly, four passes could also be used. As in FIG. 8, there may be top and bottom plates or end closures, and an enclosing peripheral wall, or shell, or cowling, by which the assembly is enclosed. Again the inlet pipe 58 and outlet pipe 80 may be on the same side and have parallel center line axes, or may be mounted on opposite sides, or on 90° spacing.

In the embodiments shown, as for example in FIGS. 8 and 9, a compact arrangement may facilitate mounting of the heat exchanger assembly in a basement, or utility room, and may in some instances permit the heat exchanger assembly to be mounted to a main drain stack, such as a typical 3" diameter stack pipe, rather than necessarily being floor-mounted.

Figure 10A:
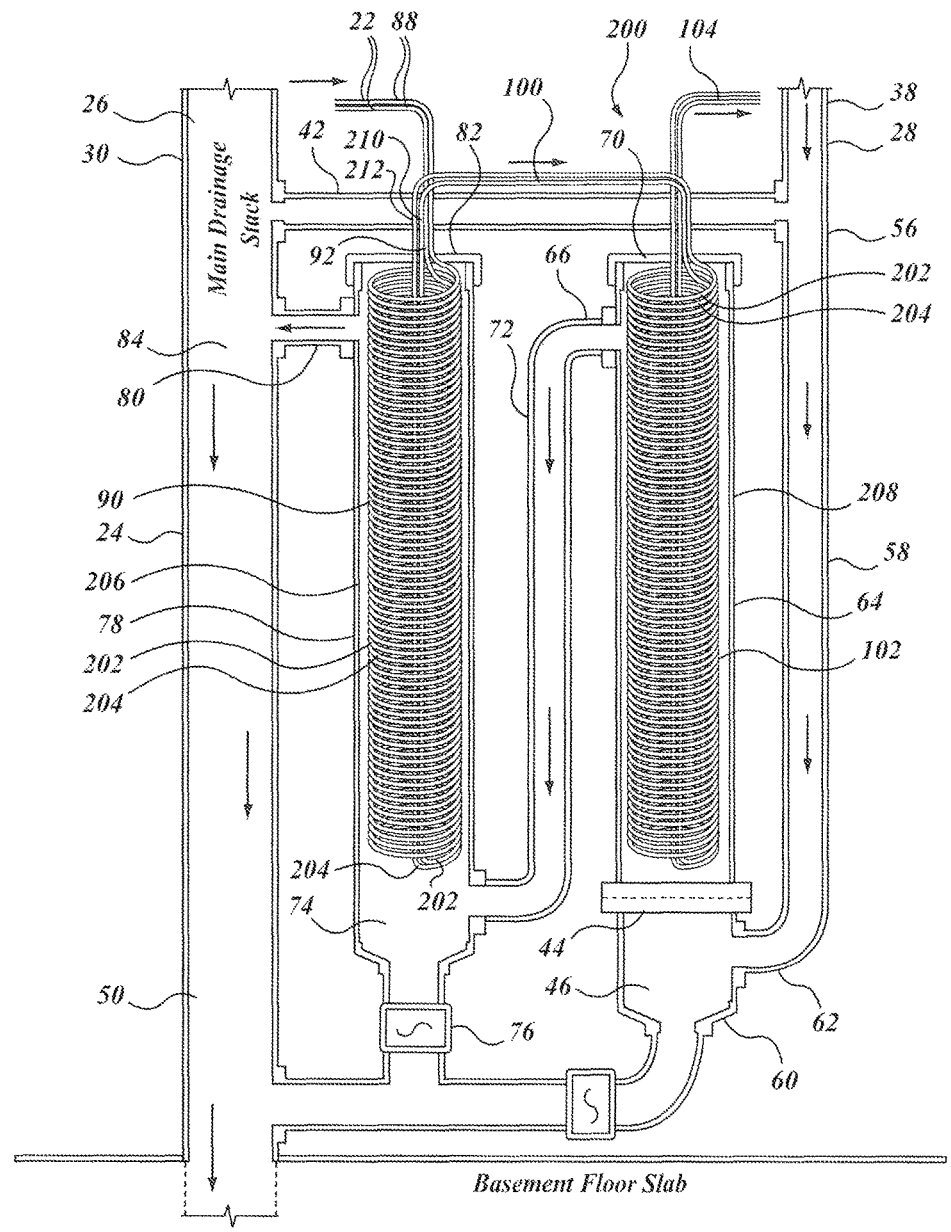
FIG. 10a is a view of an alternate embodiment of a heat exchanger apparatus to that of FIG. 2.
Figure 10B:
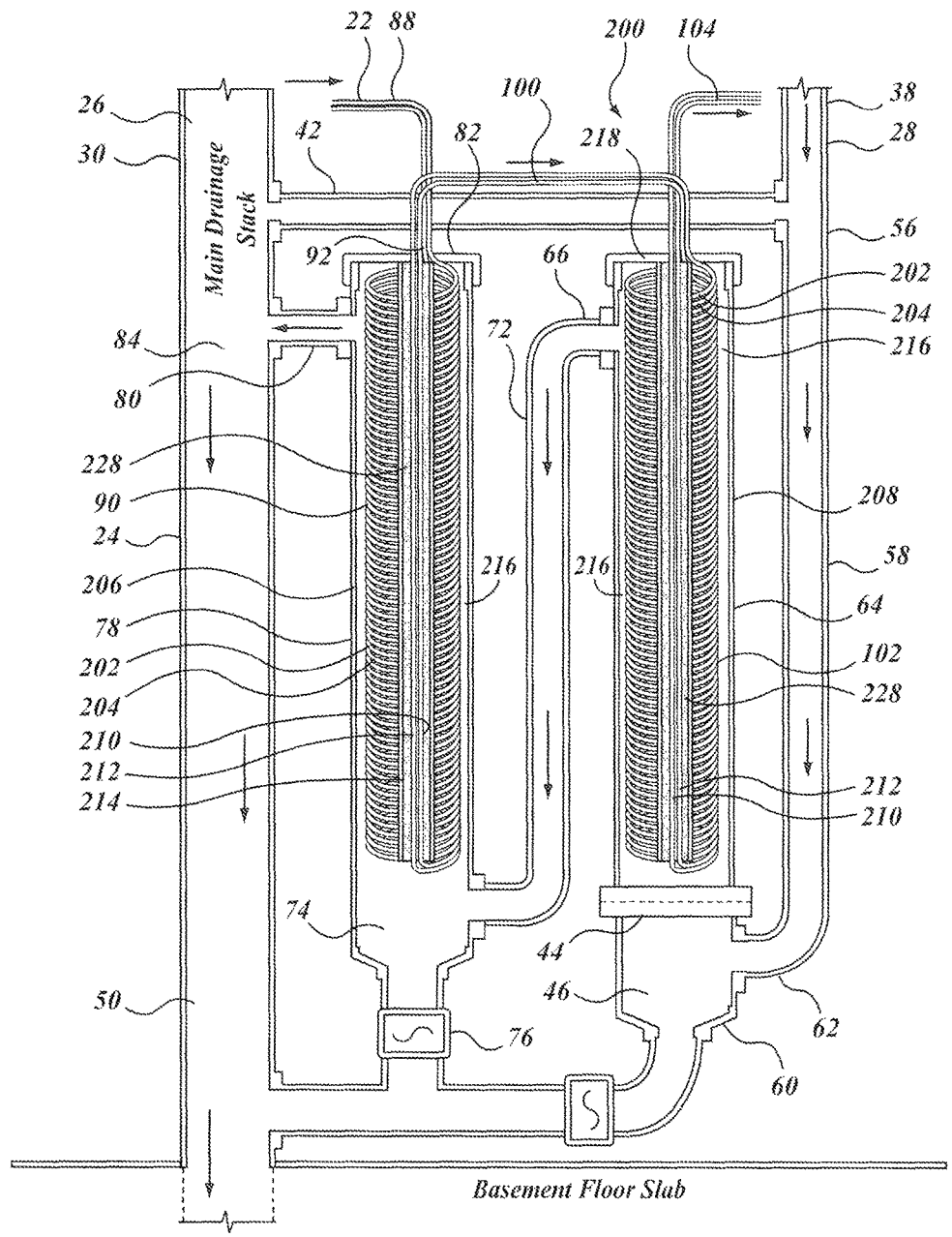
FIG. 10b is a further view of the embodiment of FIG. 10, sectioned to show details within the heat exchange coils.
Figure 11A:
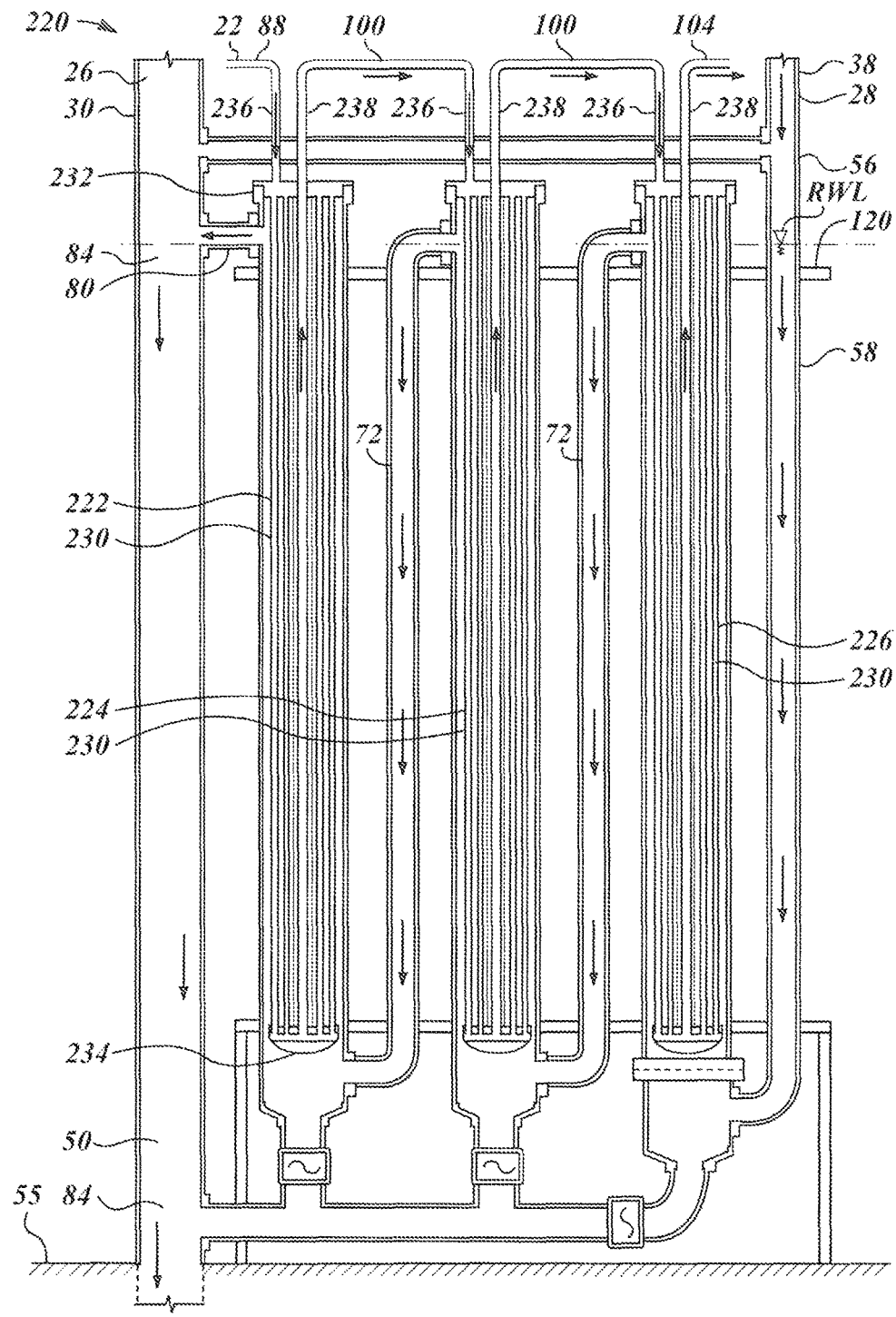
FIG. 11a shows a further alternative embodiment to that of FIG. 2.
Figure 11B:
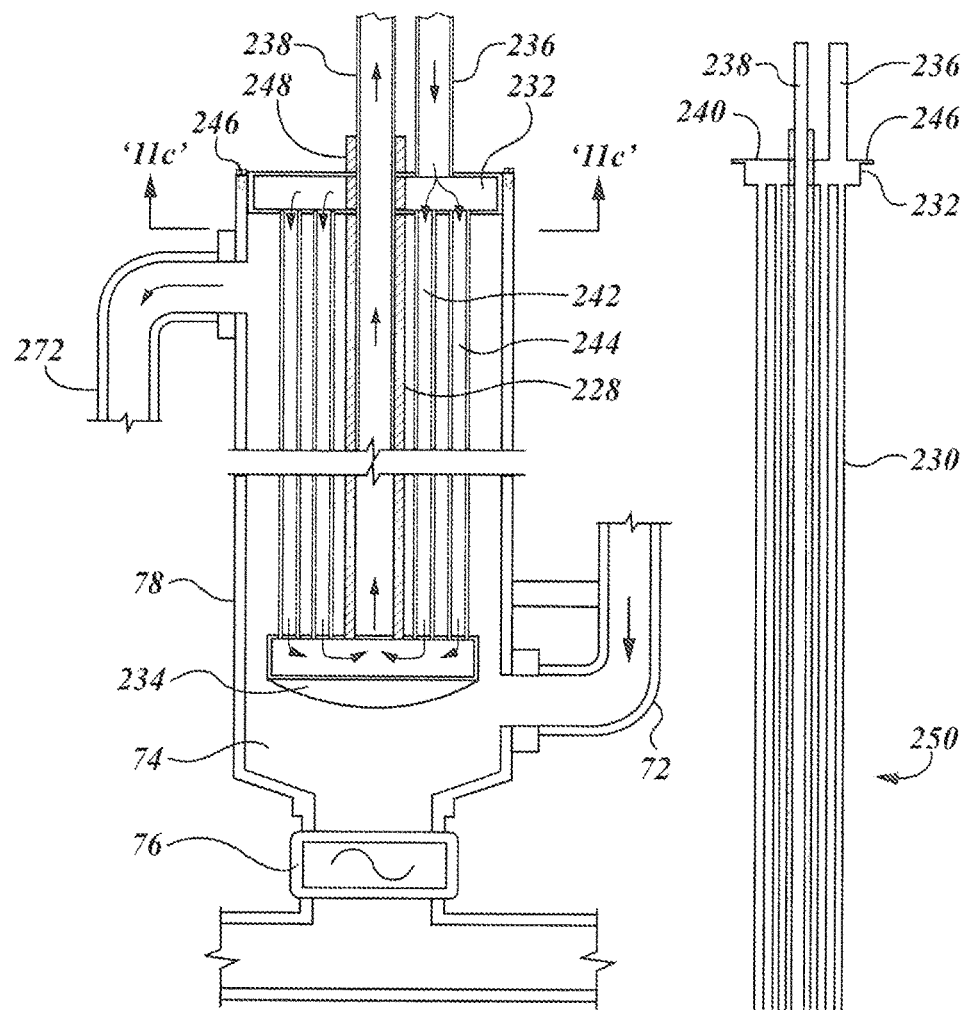
Figure 11C:
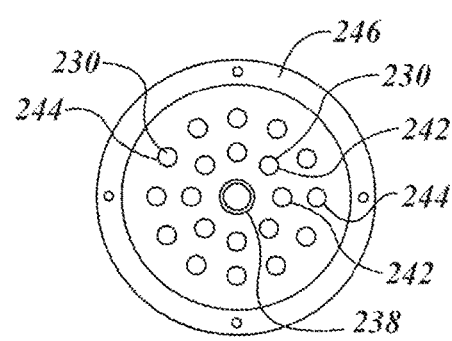
Figure 11D:
Figure 12A:
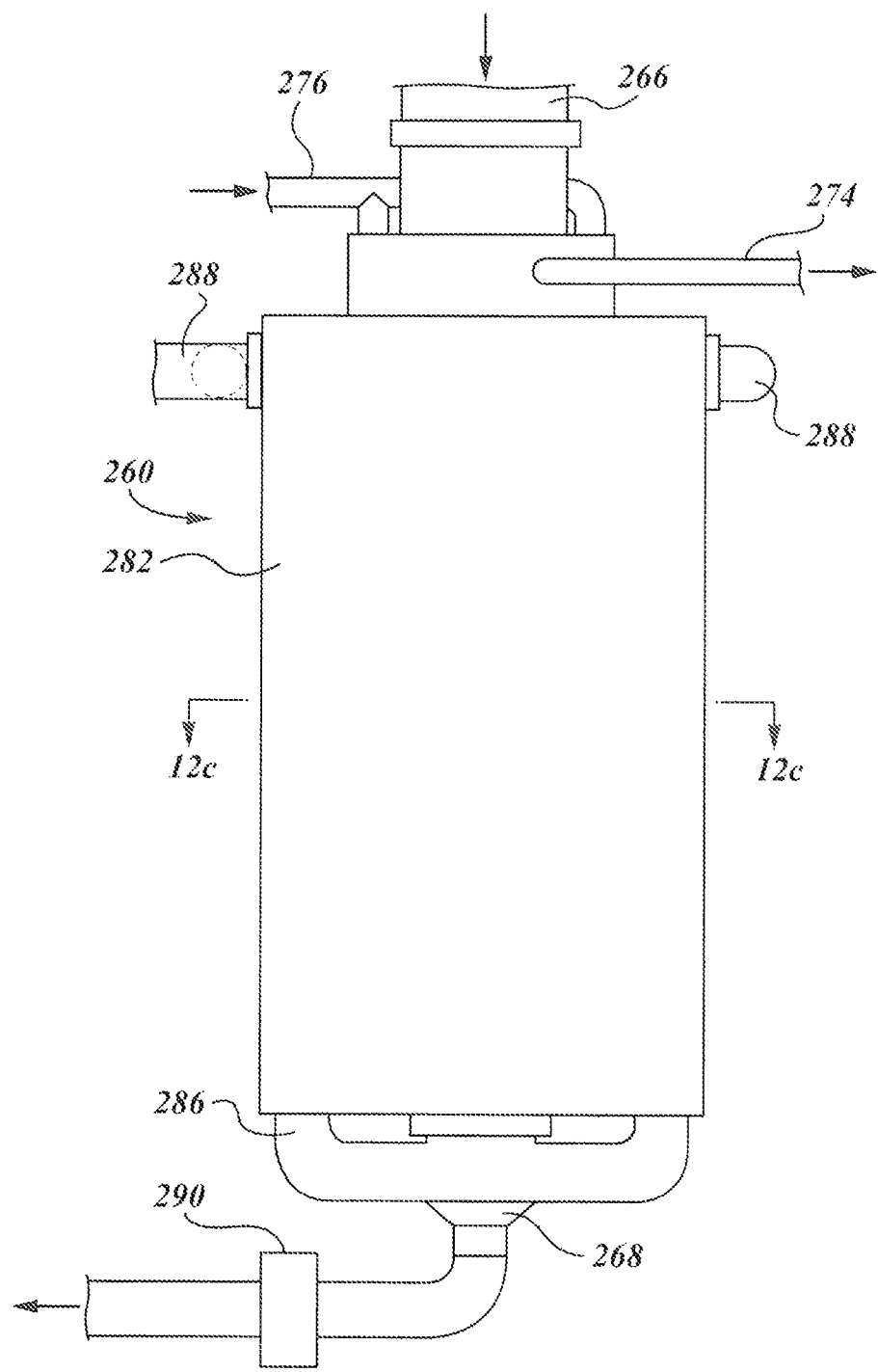
FIG. 12a is a side view of an alternate embodiment to that of FIG. 2.
Figure 12B:
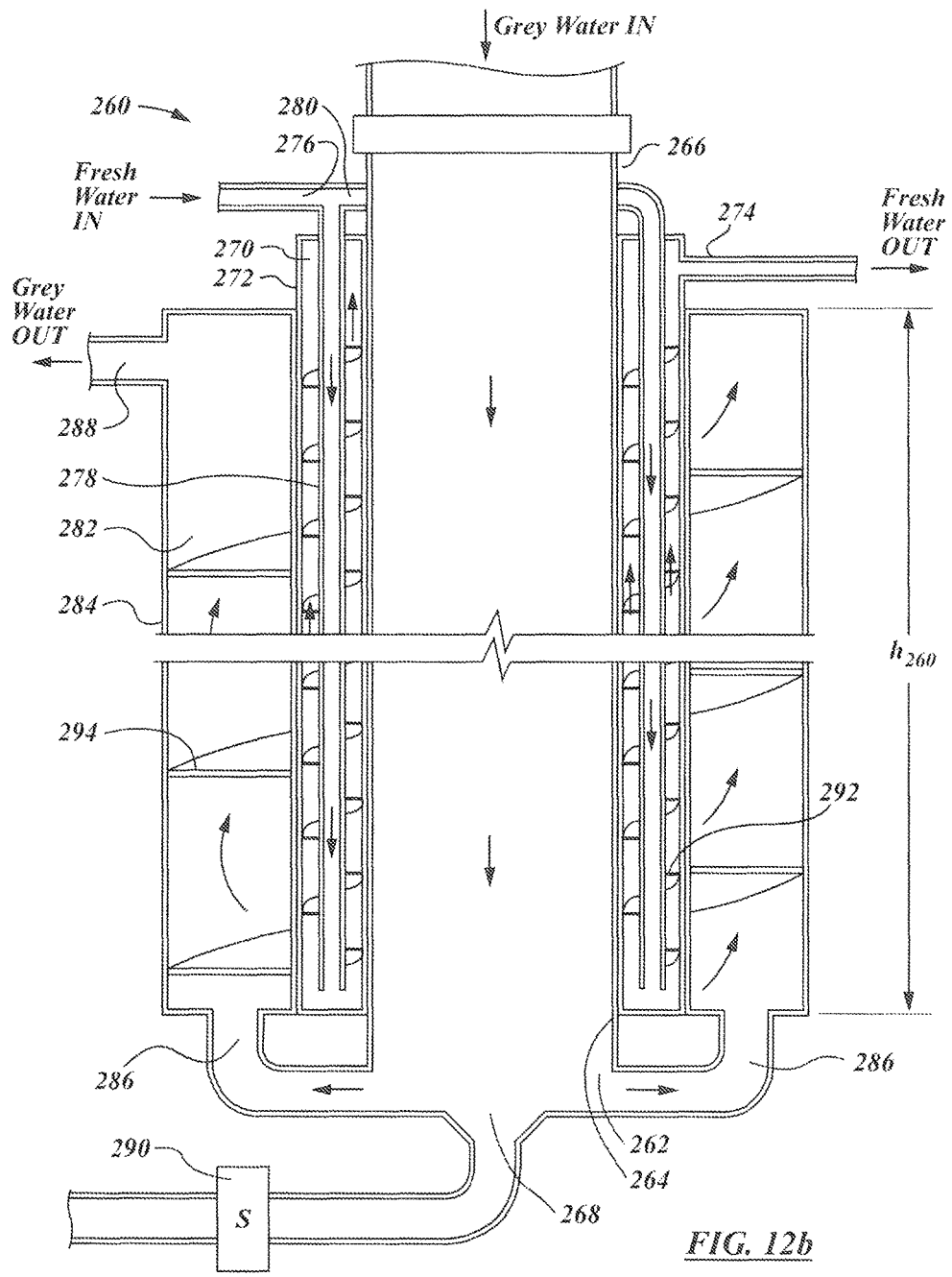
Figure 12C:
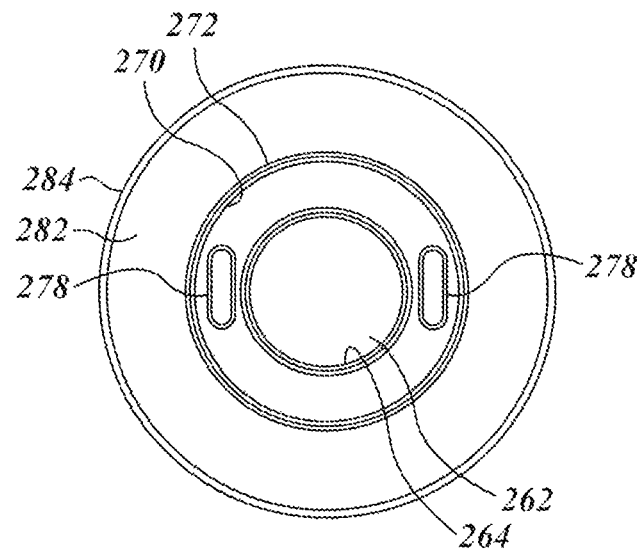
Figure 12D:
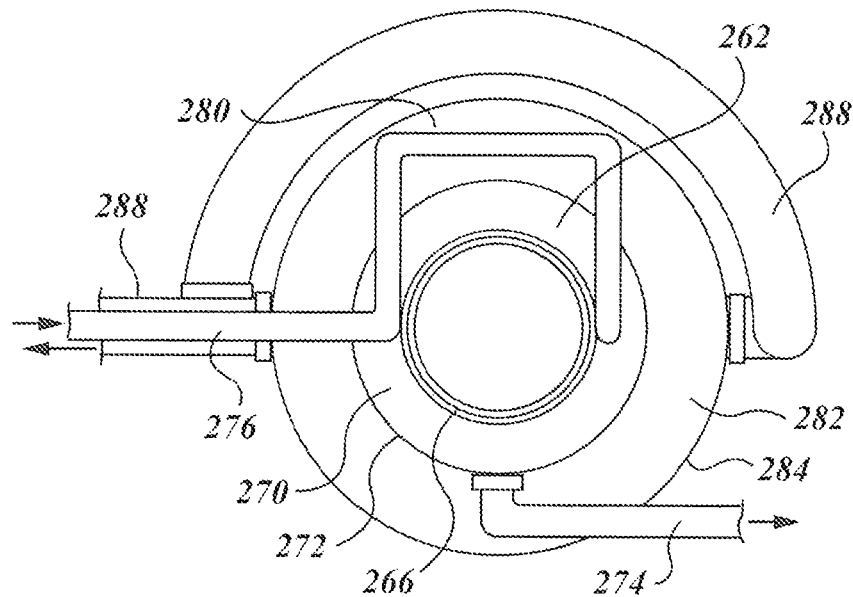
Figure 12E:
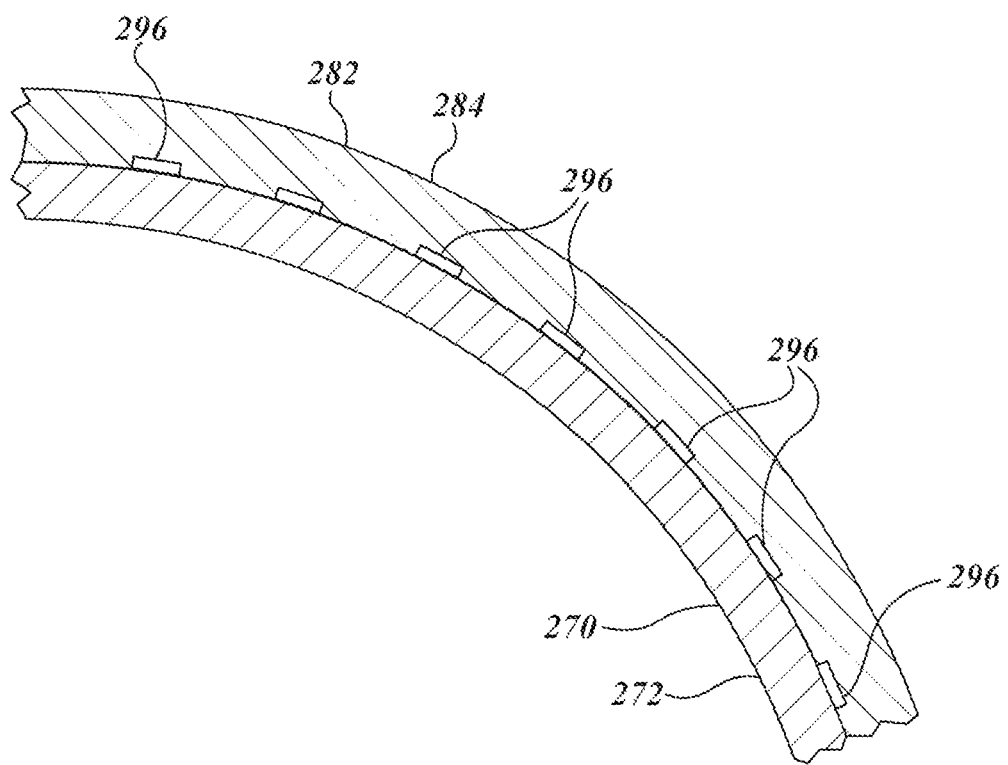
FIG. 12e shows a double-wall section of the embodiment of apparatus of FIG. 12a showing internal fluting.

In the embodiment of FIGS. 10*a* and 10*b*, a heat exchanger arrangement 200 is substantially similar to that of FIG. 2. However, as illustrated it has a pair of coils 202, 204 in each heat exchanger pass 206, 208 respectively. In this example the coils may be ½" copper or stainless steel pipe, that have been teed off a ¾" supply line. The coils are wound on a common diameter and are nested axially, such that the turns of the coils alternate along the combined coil. Similarly, the return legs 210, 212 may run side-by-side back to the top of the unit, where they may again be teed back together, or fed to the adjacent pass as a twin line. For ease of modularity and facilitation of assembly and installation, a single entrance fitting and a single exit fitting (as opposed to a dual fitting) may be convenient. In one embodiment the coils may be teed together at the bottom end of the leg, and only a single, larger diameter, return leg may penetrate the top closure cover.

In FIG. 10*b*, the front sides of the coils have been removed to reveal an inner pipe 214 of smaller diameter. Pipe 214 is nested within outer pipe 78, such that coils 202, 204 locate in an annular cavity 216 between pipe 214 and pipe 78. For example, pipe 78 may be a 6" i/d pipe, and pipe 214 may be a 2" i.d. pipe, such that the annulus is 2" wide, less the thickness of the 2" i.d. pipe wall (the thickness of a Schedule 40 pipe being typically ³⁄₁₆", such that the outside diameter is about 2⅜"). Pipe 214 is blocked to prevent wastewater flow therethrough. It may be blocked by being mounted to, or capped by, end cap 218, or it may be blocked by an internal wall or baffle, or by a bottom end cap located at the entrance of the return legs, or leg. It may be relatively convenient for pipe 214 to be blocked by the attachment to end cover, or closure, or cap 218. Alternatively, or additionally, pipe 214 may be blocked by thermal insulation 228. That is, after installation of the return leg or legs 210, 212, the remaining space within pipe 214 may be filled with insulation, such as an expanding foam insulation. Such foam, when cured, may tend to block flow of waste water, may tend to insulate the return leg or legs, and may tend to stabilise the position of the return leg, or legs, within pipe 214.

The use of an internal filler element to occupy a greater portion of the space inside the coil may also be used in any of the embodiments described above, whether they employ single tube coils, double tube coils, or coil assemblies of more than two pipes. As in the embodiment of FIGS. 10*a* and 10*b*, the central tube is obstructed to prevent flow of the other fluid. i.e., the waste water, and the blockage may be obtained by capping the tube, by virtue of its dead-end attachment to the cap, or by the use of a flow impeding filler material such as an insulating foam. Although pipe 214 is conveniently mounted concentrically with the coil, and the return legs are mounted substantially centrally or symmetrically within pipe 214, that need not necessarily be. Pipe 214 could be eccentrically mounted, and it is not necessary that the return legs be mounted within pipe 214. The return leg or legs could run parallel to pipe 214, or could be sound about it, e.g., in an helical manner. It may, however, be convenient, and may facilitate manufacture for pipe 214 to be concentric with the coil, and, as installed, with the outer casing of the pass. The filler element, namely pipe 214, is shown as having a diameter that is about, or somewhat more than ⅓ of the inside diameter of the outer shell casing (i.e., nominal 2" i.d. pipe (really 2⅜" o.d.) over a nominal 6" i.d.). The filler could be of a different size. It could be as little as ⅕ the diameter, and as much as ½ or ⅔ of the inside diameter of the outer pipe.

In this context, when the term "diameter" is used, the issue is the hydraulic diameter of the resulting flow passageway, defined by $D_h=4A/P$, where A is the area of the passageway and P is the perimeter. Reducing the hydraulic diameter, $D_h$, may tend to increase the effectiveness of heat transfer. Here, in one embodiment the annulus thickness is about 2", or a bit less (1 13/16"), and the outside diameter of the nominal 3/4" copper coils may be 7/8", such that the coil outside diameter is approximately half of the passage width (i.e., (7/8")/(1 13/16")=14/29=approximately half). The ratio could be between 1/3 and 2/3; or perhaps between 2/5 and 3/5. However 1/2 is convenient. While FIGS. 10a and 10b illustrate a two pass arrangement, the arrangement could have a different number of passes, be it three, or four, or some other number.

In one embodiment, the apparatus included heat exchanger modules employing stainless steel coils in a 6" i.d. pipe, with a central 2" i.d., Schedule 40 pipe mounted to cause waste water flow in the annulus. The apparatus was run with an inlet flow equal to the outlet flow at 10 L/min (approx. 2½ US Gal/min). In a two pass arrangement in series, with a fresh water inlet temperature of 16.2 C, and a waste water inlet at 40 C. The fresh water temperatures were 16.2 C at inlet to the first stage; 20.4 C at the mid-point between stages; and 27.1 C at the outlet leading to the water heater. The waste water temperatures were 40 C at inlet; 33.3 C at the mid-point; and 27.2 C at the outlet. The mean drop across each coil from hot side to cold side was 13 C, and, for a hot water heater outlet temperature of 55 C (130 F), the heat recovery was 28% of the heat input otherwise required to heat the water to the desired 55 C output temperature. Taking a measure of efficiency of (27.1-16.2)/(40-16.2=10.9/23.8=46% of potential heat recovery. Using the same modules in three units in series, at the same flow rate, the corresponding temperatures were fresh water inlet 17.2 C; first mid-stage temperature 20.1 C; second mid-stage temperature 24.7 C; outlet 30.1 C to hot water heater inlet. Waste water inlet 40.2 C; second mid-stage 35.7 C; first mid-stage 29.6 C and outlet 26.6 C. The mean drop across the coils from hot side to cold side was 9.5 C. For the desired 55 C water heater outlet temperature, the pre-heating was providing 34% of the heating load that would otherwise have to be provided by the heater. The corresponding measure of overall heat exchanger efficiency was (12.9/23.0)=56% of the potential recoverable heat. These measurements were taken in summer, when the inlet fresh water temperature is relatively high (17 C). In the winter, the inlet water temperature may be as low as 4 C. A larger temperature drop potential may tend to increase the potential heat recovery, and also to increase the relative efficiency. It may be noted that in the example, the coils are free of additional fin-work and free of the soldering, brazing, or other manufacturing steps associated with making more complicated fin-coil or finned-tube heat exchangers.

In FIGS. 11a-11d, there is an embodiment of heat exchanger apparatus indicated generally as 220. The external casing and piping may be taken as being substantially the same as those of the embodiments previously described. They may vary in aspect ratio. For example, the external casings of first, second, and third passes 222, 224, and 226 may be 6" or 8" diameter pipes. First, second, and third passes 222, 224 and 226 may be understood to be assembled and connected in a series, or counter-flow, configuration relative to the waste water flow path. Each of the passes may be taken as being of substantially the same construction, unless indicated otherwise. Apparatus 220 may differ from the apparatus previously described in having a set of longitudinal tubes 230 running between an inlet header at top end cap 240, or manifold 232, and a return or collector, or outlet manifold or header 234 at the far end of the assembly distant from top end cap 240. Inlet manifold 232 is connected to a first, or inlet, pipe 236. The outlet manifold is connected to a second, or return, pipe, or leg, 238. It may be convenient for the return leg to be centrally mounted to header 234, and to pass centrally through header 232 without being in fluid communication therewith. Inlet header 232 may have the form of an hollow cylindrical disc, or plenum that feeds tubes 230. Outlet header 234 may be similar. In one embodiment, the end cap of return header 234 may have a domed shape. It may also be convenient for the members of the set or array of tubes 230 to be mounted in an array that is concentric with return leg 238, although this need not be so. It is not necessary that return leg 238 be straight. It could be curved. It could be helical. Similarly, tubes 230 need not be straight. They could be angled or curved or helical. It is convenient that they be straight and parallel. As may be understood from FIG. 11c, tubes 230 may include an inner set of pipes 242 and an outer set of pipes 244, which may be arranged concentrically, as indicated. As also indicated, the end of return header 234 may be rounded or bulbous.

Tubes 230, manifolds 232, 234, inlet pipe 236 and outlet pipe 238 may combine to form a single tube bundle assembly 250. Assembly 250 may then be installed or removed as a single pre-assembled unit. To that end, manifold 232 has a peripheral flange 246 suited for attachment by threaded fasteners to the end of the outer housing shell pipe wall. To that end the outer housing shell pipe wall may have a corresponding thickened end or ring or flange, which may itself have corresponding tapped bores. As may be noted, outlet pipe 238 passes through both the inner and outer walls of inlet manifold 232. Seals are made on both walls with compression fittings 248. Outlet pipe 238 may be encased in insulation as at 228, or in a jacket that serves to reduce the flow path cross-sectional area in the remainder of the chamber inside the outer jacket. As with the other embodiments, whether a pipe is an "inlet" or an "outlet" is at least to some degree arbitrary. In general, the arrangements of inlets and outlets may typically be intended to cause the flow of heating and cooling fluids to be in opposite directions. As with the other embodiments, assembly 220 may include two heat exchanger passes, or three, as shown, or four, or some other larger number as may be.

In the embodiments shown, other than the forming of the coils themselves, the assembly may be made with readily available, standard fittings of copper pipe (or stainless steel pipe) and plastic components. It is intended not to require rare or specialised molded parts. That is, even if repair or replacement of parts is required many years after original installation in a relatively remote location, there is a fair possibility of obtaining standard replacement parts at a general hardware or building supply retail outlet. It may not require the shipment of a unique original equipment manufacturer part that may be of limited availability or high expense, or both.

In the embodiment of FIGS. 12a-12d, a heat recovery apparatus 260 may have a grey water supply fed into a first member, or conduit, or passage, or piping, or chamber 262 such as may have the form of a cylinder 264, which may be a cylindrical canister with an inlet at one end, as at inlet 266 at the top; and an outlet at the other end, as at 268 at the bottom. As with the other embodiments, the terms "inlet" and "outlet" are somewhat arbitrary, depending on how the fluids are run through apparatus 260. A second member, or conduit, or passageway, or chamber, or tubing or pipe, etc., defining a chamber, 270 may be mounted about chamber 262. Second member 270 may be an annular canister or tube 272 mounted about first member 262. So that a thermally conductive path may be obtained, second member 270 may be shrink fit on first member 262. Alternatively, thermally conductive members may be sandwiched between the outside surface of 262 and the inside surface of 270. It may be convenient that the two members be concentric. Member 270 has a fresh water outlet as at 274 and an inlet as at 276. Inlet 276 may be bifurcated (or may have several inlet legs or return legs, however they may be called depending on the direction of flow), as at 278, that meet in, or extend away from, a common manifold, as at 280. Either or both of outlet 274 and inlet 276 may have multiple branches connected by a common manifold. A third member 282 such as may be a conduit, pipe, tube, chamber, etc., may be indicated as an annular outer cylinder or canister 284. As before, it may be mounted concentrically about members 262 and 270, and in one embodiment it may be shrink fit onto the outside of member 270. Third member 282 may have an inlet, or inlets, 286 that is, or are, fed from outlet 268 of first member 262. The lowermost point of the connecting piping may also have a sump drain, such as may be controlled by an outlet valve 290, which may be a solenoid controlled valve. Third member 282 has an outlet 288, which may be taken as being the same as outlet 80, above. Optionally, either or both of members 270 and 282 may have vanes or a helical baffle or baffles, indicated respectively at 292 in member 270 and at 294 in member 282, such as may tend to cause the flow to move in a swirling or helical path and such as may tend to enhance heat transfer to the respective conductive walls. Alternatively, either or both of the grey water or fresh water inlets to members 270 and 282, respectively, may be arranged tangentially in such a manner as to impart a circumferential component of velocity to the flow inside the various canisters. Alternatively, flow directing members, or baffles, may be mounted in a maze, or zig-zag, or serpentine arrangement such as may tend to enhance heat transfer at the conduction wall.

In this embodiment, either of the outside wall of member 270 or the inside wall surface of member 282 may have splines or flutes 296. The same may also apply at the interface between item 262 and item 270. The double-walled interface between member 262 and member 270; and between member 270 and member 282 may tend to require a double failure for the flow of fresh water and waste water to mix. Inasmuch as the bottom of the unit is open, in the event of even a single failure, dripping from the bottom of the unit may tend to indicate that a failure has occurred. The unit may be provided with an electronic moisture sensor to trigger an alarm condition in the event of moisture detection in the bottom of the unit. Where there is grooving at the interface between the units, as due to splines or flutes, such grooving may tend to permit any leaving material to drain.

Assembly 260 may be connected, e.g., in series, with other such assemblies as in the manner of the other modules described above. However many such modules there may be, they may be enclosed within a housing, such as cowling 128. Such an enclosure may have a leak drain, internal moisture sensor, and alarm, as discussed.

As noted in respect of the other embodiments described above, it may be arbitrary which is an "inlet" and which is an "outlet". Likewise, the sense of fresh water inlet and outlet could be reversed such as to cause the inlet flow to be generally in the opposite direction to the flow in the outer grey water canister.

Figure 13:
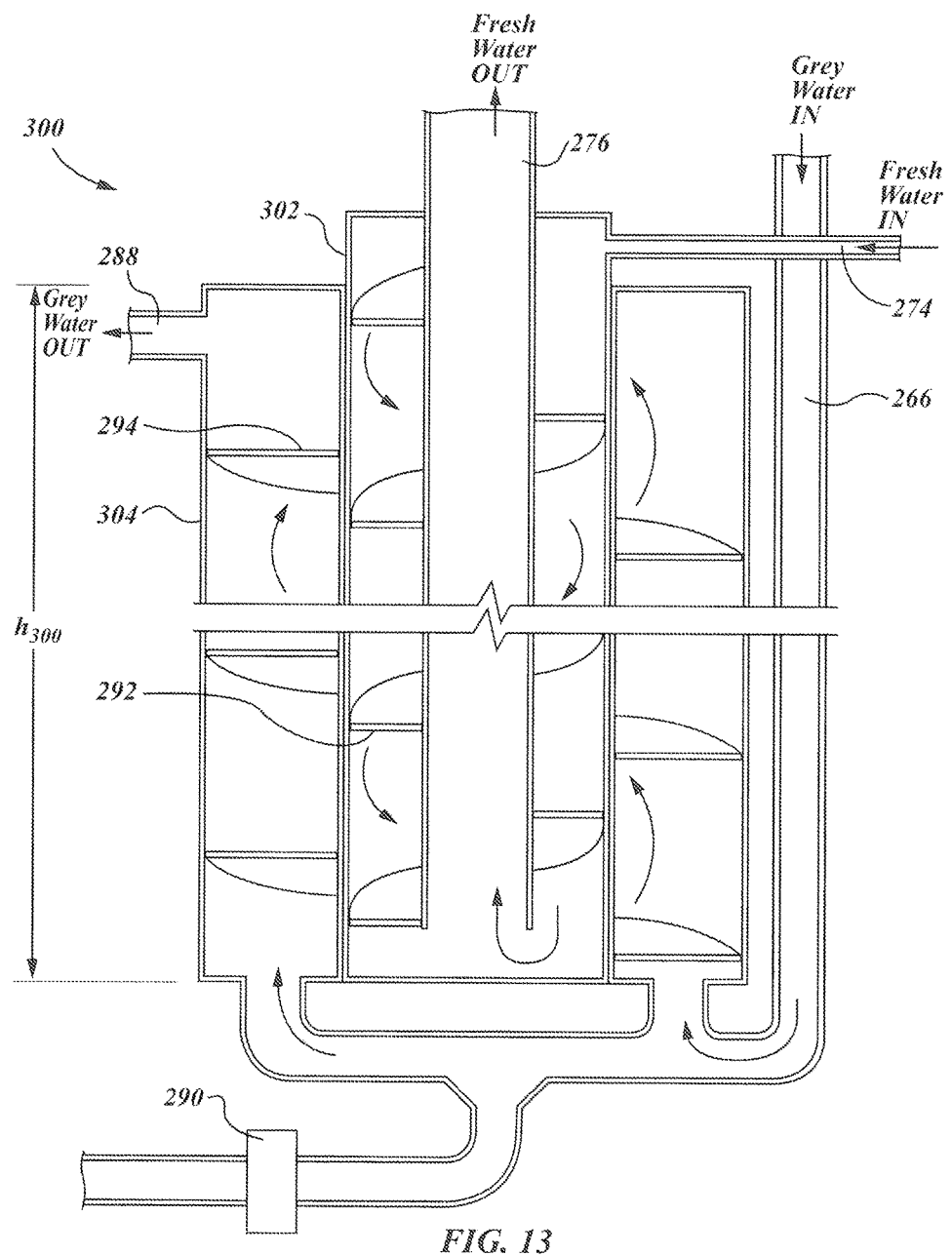

In the embodiment of FIG. 13, rather than having a three-layered concentric unit of members 262, 270 and 282, an assembly 300 may have a single fresh water member or canister 302 nested concentrically within an outer waste water canister 304. As before, there is a double-walled interface between the fresh-water and waste water sides of the unit.

The drawings of the Figures may not be to scale. As noted above, in FIG. 12*a*, the outside diameter of member 262 may be 2 inches, corresponding to the inside diameter of member 270. The outside diameter of member 270 may be 3 inches or four inches, which corresponds to the inside diameter of member 282. The outside diameter of member 282 may be 4 inches (where id is 3 inches) or 5 or 6 inches (where id is 4 inches). In terms of general proportions, the overall height of the canisters, indicated as $h_{260}$, in respect of assembly 260 of FIGS. 12*a*-12*e*, and $h_{300}$ in respect of assembly 300 of FIG. 13, may be of the order of 1 m or 40 inches. It could of course be as short as 30" to 36", and as tall as 60", 72", or 78". In one particular embodiment, the inner canister may be about 2" (5 cm) in diameter, the fresh-water annulus may have a radial thickness of about ½" (13 mm) (giving an outside diameter of about 3" (7½ cm)). The aspect ratio height to diameter of the unit, assembly 260, overall, is then about 10:1. The aspect ratio may be in the range of about 5:1 to about 20:1. For assembly 300, the overall aspect ratio ranges may be roughly the same. The various tubes and canisters may be made of metal, such as copper or stainless steel, and the parts may be assembled as by heat shrinkage onto each other. The connection at the grey water inlet may include an adapter between a non-metallic pipe, such as ABS, and a metallic pipe of the heat exchanger assembly, be that pipe copper or stainless steel, for example. The connections to fresh water supply and to the water heater, and the connections to the grey water drains and stack may be understood as being the same, or substantially the same, as described above. The fresh water supply conduit may typically be taken as ⅝ inch copper upstream and downstream of the unit, be it 260 or 300.

What has been described above has been intended illustrative and non-limiting and it will be understood by persons skilled in the art that changes and modifications may be made without departing from the scope of the claims appended hereto. Various embodiments of the invention have been described in detail. Since changes in and or additions to the above-described best mode may be made without departing from the nature, spirit or scope of the invention, the invention is not to be limited to those details but only by the appended claims.

We claim:

1. A grey water heat recovery apparatus in which heat is transferred between a grey water stream and a fresh water stream, wherein said apparatus comprises:
    a heat exchanger having at least a first pass and a second pass, the first pass and second pass being mounted in series;
    the heat exchanger having a gravity-fed grey water flow path, said grey water flow path including a first portion in said first pass, and a second portion in said second pass, said first portion in said first pass being upstream of the second portion in said second pass, said grey water flow path having a source inlet, and a drain outlet;
    said grey water flow path having an intermediate portion lower than said drain outlet;
    said heat exchanger having a pressure-fed fresh water flow path, said fresh water flow path being segregated from said grey water flow path;
    said fresh water flow path having a first portion in said second pass, and a second portion in said first pass, said second portion of said fresh water flow path being downstream of said first portion of said fresh water flow path;
said fresh water flow path of said heat exchanger being at least predominantly immersed in said grey water flow path;
said fresh water flow path having a fresh water source and a fresh water outlet, both said fresh water source and said fresh water outlet being positioned at respective heights higher than said drain outlet of said grey water flow path; and
said heat exchanger being free of fresh water wall penetrations of said grey water flow path lower than said drain outlet of said grey water flow path;
said first pass and said second pass are predominantly upstanding, and are mounted side-by-side;
said first pass includes a first shell defining an outer wall of a first portion of said grey water flow path;
said second pass includes a second shell defining an outer wall of a second portion of said grey water flow path;
said first portion of said fresh water flow path is nested within said second shell;
said second portion of said fresh water flow path is nested within said first shell;
said first shell has a first resting sump fluid level, and said second portion of said fresh water flow path has an entrance to and an exit from said first shell, both of said entrance to and said exit from said first shell being at a level at least as high as said first resting sump fluid level; and
said second shell has a second resting sump fluid level, and said first portion of said fresh water flow path has an entrance to and an exit from said second shell, both of said entrance to and said exit from said second shell being at a level at least as high as said second resting sump fluid level;
one of said first and second portions of said fresh water flow path includes a first tube bundle;
said first tube bundle has an array of feeder tubes carrying fresh water in a first direction, and a return carrying fresh water in a second, opposite direction: and
said apparatus additionally includes a space filling member positioned to reduce flow path area of the grey water, said space filling member being mounted to said return.

2. The apparatus of claim 1 wherein said first pass and said second pass are of substantially the same size and are mounted together within a unitary housing.

3. The apparatus of claim 1 wherein said heat exchanger has more than two passes, and said more than two passes are mounted in a side-by-side bundle.

4. The apparatus of claim 1 wherein said space filling member includes thermal insulation, said thermal insulation being mounted to said return.

5. The apparatus of claim 1 wherein:
said first shell has at least a first closure fitting at an uppermost end thereof;
both of said entrance to and said exit from said first shell of said second portion of said fresh water flow path being carried through said first closure fitting of said first shell;
said second shell has at least a second closure fitting at an uppermost end thereof; and
both of said entrance to and said exit from said second shell of said first portion of said fresh water flow path being carried through said second closure fitting of said second shell.

6. The apparatus of claim 1 wherein:
said first pass includes a first cylindrical plastic pipe defining an outer wall of a first portion of said grey water flow path;
said second pass includes a second cylindrical plastic pipe defining an outer wall of a second portion of said grey water flow path;
said second portion of said fresh water flow path includes said first tube bundle, said first tube bundle being nested within said first plastic pipe;
said first portion of said fresh water flow path includes a second tube bundle nested within said second plastic pipe;
said second tube bundle having a fresh-water source connection fitting;
said second tube bundle being connected in series to said first tube bundle;
said first and second tube bundles being made of metal;
each of said first and second cylindrical plastic pipes is predominantly upstanding;
each of said first and second plastic pipes has a bottom end closure;
each of said first and second plastic pipes has a top end closure;
each of said first and second tube bundles has a respective said return defining a counter-direction leg, whereby each of said first portion and said second portion of said fresh water flow path has first and second terminations, and said first and second terminations pass through the top end closure of said first and second cylindrical plastic pipes, respectively;
said top end closures of said first and second cylindrical plastic pipes being higher than said drain outlet of said grey water flow path; and
said first and second cylindrical plastic pipes and said first and second tube bundles extending downwardly of said drain outlet whereby said cylindrical plastic pipes define first and second sump portions, and said first and second tube bundles are predominantly submerged in said second and first sump portions.

7. The apparatus of claim 1 wherein said first and second passes are enclosed together by an external housing, with grey water and fresh water connection fittings being externally accessible.

8. In combination, the grey water heat recovery apparatus of claim 1 and a water heater, the fresh water flow path of the grey water heat recovery apparatus being upstream of the water heater, the water heater having supply conduits to at least a first hot water load, and the grey water flow path of the heat recovery apparatus of claim 1 being mounted to receive grey water from at least said first hot water load.

9. The apparatus of claim 1 wherein one of said first and second portions of said fresh water path of said apparatus includes a tube bundle, said tube bundle having an outlet and an inlet, both of said outlet and said inlet being located at one end of said tube bundle, whereby said tube bundle may be extracted from one end of said apparatus.

10. The apparatus of claim 9 wherein said tube bundle includes an inlet header, a return header, an array of feeder tubes extending between said inlet header and said return header, and a return; said inlet header is mounted concentrically about said return, said return passing though said inlet header free of fluid communication therewith.

11. The grey water heat recovery apparatus of claim 1 wherein said apparatus is enclosed in a unitary cylindrical housing in which both of said first and second passes are enclosed, through which externally accessible grey water and fresh water connection fittings pass, the fresh water connection fitting extending through a top end of said cylindrical housing, and said grey water connection fittings extending through a sidewall of said cylindrical housing.

12. A grey water heat recovery apparatus in which heat is transferred between a grey water stream and a fresh water stream, wherein said apparatus comprises:
  a heat exchanger having at least a first pass and a second pass, the first pass and second pass being mounted in series;
  the heat exchanger having a gravity-fed grey water flow path, said grey water flow path including a first portion in said first pass, and a second portion in said second pass, said first portion in said first pass being upstream of the second portion in said second pass, said grey water flow path having a source inlet, and a drain outlet;
  said grey water flow path having an intermediate portion lower than said drain outlet;
  said heat exchanger having a pressure-fed fresh water flow path, said fresh water flow path being segregated from said grey water flow path;
  said fresh water flow path having a first portion in said second pass, and a second portion in said first pass, said second portion of said fresh water flow path being downstream of said first portion of said fresh water flow path;
  said fresh water flow path of said heat exchanger being at least predominantly immersed in said grey water flow path;
  said fresh water flow path having a fresh water source and a fresh water outlet, both said fresh water source and said fresh water outlet being positioned at respective heights higher than said drain outlet of said grey water flow path; and
  said heat exchanger being free of fresh water wall penetrations of said grey water flow path lower than said drain outlet of said grey water flow path;
  said first pass and said second pass are predominantly upstanding, and are mounted side-by-side;
  said first pass includes a first shell defining an outer wall of a first portion of said grey water flow path;
  said second pass includes a second shell defining an outer wall of a second portion of said grey water flow path;
  said first portion of said fresh water flow path is nested within said second shell;
  said second portion of said fresh water flow path is nested within said first shell;
  said first shell has a first resting sump fluid level, and said second portion of said fresh water flow path has an entrance to and an exit from said first shell, both of said entrance to and said exit from said first shell being at a level at least as high as said first resting sump fluid level;
  said second shell has a second resting sump fluid level, and said first portion of said fresh water flow path has an entrance to and an exit from said second shell, both of said entrance to and said exit from said second shell being at a level at least as high as said second resting sump fluid level;
  said first shell and said second shell are each made from a respective cylindrical pipe;
  said cylindrical pipe has a first end and a second end;
  said cylindrical pipe has at least a first closure fitting; said first closure fitting mates with said first end of said cylindrical pipe;
  said first and second portions of said fresh water flow path includes a respective tube bundle;
  said entrance and said exit of said respective first and second portions of said fresh water flow path are mounted through said respective first closure fittings;
  said tube bundles being removable through said first ends of said cylindrical pipes respectively;
  each tube bundle has an inlet and an outlet connected to a respective said entrance and exit of said first and second portions of said fresh water flow path;
  both of said inlet and said outlet of each respective tube bundle being located at one end thereof nearest said respective closure fitting;
  each said tube bundle having a plurality of tubes fed through a common header, said plurality of tubes running in one direction, and a return running in an opposite direction, said return passing through said header and being free of fluid communication therewith, said return being of larger diameter than said feeder tubes;
  a space filling member positioned to reduce flow path area of the grey water; and
  said space filling member being mounted outside said return, said plurality of tubes being mounted outside said space filling member, and said grey water being restricted to flow along said plurality of tubes in a region outside the space filling member.

13. A grey water heat recovery apparatus in which to transfer heat between a grey water stream and a fresh water stream, wherein said grey water heat recovery apparatus comprises:
  a heat exchanger having a first pass and a second pass, said first pass and said second pass being connected in series;
  said heat exchanger having a first side defining a grey water flow path, and a second side defining a freshwater flow path, said grey water and fresh water paths being segregated from each other;
  said grey water flow path being a gravity-feed flow path;
  said fresh water flow path being a pressure-feed flow path;
  said heat exchanger having a grey water flow path inlet and a grey water flow path outlet, at least a portion of one of said first pass and said second pass being lower than said grey water flow outlet whereby said heat exchanger defines at least a first grey water sump;
  said first pass including a first cylindrical pipe member through which to conduct the grey water stream, said first cylindrical pipe member defining a containment wall of a first portion of said grey water flow path;
  said second pass including a second cylindrical pipe member through which to conduct the grey water stream, said second cylindrical pipe member defining a containment wall of a second portion of said grey water flow path;
  said first cylindrical pipe member having a grey water inlet and a grey water outlet;
  said first cylindrical pipe member having a first end, and a first end member, said first end member defining a closure of said first end of said first cylindrical pipe member;
  a first fresh water flow element nested within said first cylindrical pipe member, said first fresh water flow element extending axially within said first cylindrical pipe member;
  said first fresh water flow element having an inlet and an outlet;

both said fresh water inlet and said fresh water outlet being mounted to pass through said first end member of said first cylindrical pipe member; and said first and second cylindrical pipe members are each elongate and are mounted together side-by-side in a predominantly upstanding orientation; and said apparatus is circumscribed by an external housing in which both of said first and second passes are enclosed, said housing having a generally cylindrical shape, with grey water and fresh water connection fittings protruding from said housing and being externally accessible.

14. The grey water heat recovery apparatus of claim 13 wherein said first fresh water flow element includes a metal tube bundle, said metal tube bundle having a counter-direction leg, said fresh water flow element has first and second end connections, both of said first and second end connections of said metal tube bundle passing through said first end of said first cylindrical pipe member.

15. The grey water heat recovery apparatus of claim 13 wherein said first and second cylindrical pipe members are mounted adjacent to at least one of (a) a main stack drain pipe; and (b) a water heater; the water heater having an overall height, and the heat recovery apparatus having an overall height, the overall height of the heat recovery apparatus being in the range of 2/3 to 3/2 of the height of the water heater.

16. The grey water heat recovery apparatus of claim 13 wherein one of:
(a) said first pass and said second pass are connected to define a single grey water sump in which the grey water outlet of the first pass is connected to a lower portion grey water entry of the second pass; and
(b) said first pass and said second pass are connected to define a first grey water sump in said first pass and a second grey water sump in said second pass, in which the outlet of the first sump is carried to a top portion entry into said second sump.

17. The grey water heat recovery apparatus of claim 13 in combination with a water heater, wherein said grey water heat recovery apparatus is connected as a fresh water pre-heater for said water heater.

18. The grey water heat recovery apparatus of claim 13 wherein one of said first and second portions of said fresh water flow path of said apparatus includes a tube bundle, said tube bundle having an outlet and an inlet, both of said outlet and said inlet being located at one end of said tube bundle, whereby said tube bundle may be extracted from one end of said apparatus.

19. The grey water heat recovery apparatus of claim 18 wherein said tube bundle includes an inlet header, a return header, an array of feeder tubes extending between said inlet header and said return header, and a return; said inlet header is mounted concentrically about said return, said return passing though said inlet header free of fluid communication therewith.

20. The heat exchanger of claim 13 wherein said apparatus is enclosed in a unitary cylindrical housing in which said first and second passes of said heat exchanger are enclosed, through which externally accessible grey water and fresh water connection fittings pass, the fresh water connection fitting extending through a top end of said cylindrical housing, and said grey water connection fittings extending through a sidewall of said cylindrical housing.

21. A grey water heat recovery heat exchanger comprising:
a first cylindrical plastic pipe for grey water with a first metal tube bundle for fresh water nested therein; and a second cylindrical plastic pipe for grey water with a second metal tube bundle for fresh water nested therein;

said first cylindrical plastic pipe having an inlet for grey water;

said second cylindrical plastic pipe having an outlet for grey water;

said first and second cylindrical plastic pipes being connected in series to conduct grey water from said first cylindrical plastic pipe to said second cylindrical plastic pipe;

said first metal tube bundle being connected in series with said second metal tube bundle, said second metal tube bundle having a fresh water inlet, said first metal tube bundle having a fresh water outlet, said fresh water tube bundles being mounted for counter-flow operation relative to said grey water conducting first and second cylindrical plastic pipes;

each of said first and second cylindrical plastic pipes defining at least a portion of a respective grey water sump in which at least a portion of a respective one of said second and first metal tube bundles is mounted;

said first and second cylindrical plastic pipes are elongate and are in a predominantly upstanding orientation, and said grey water outlet of said second cylindrical plastic pipe is higher than a predominant portion of each of said first and second fresh water tube bundles; and said heat exchanger is circumscribed by an external housing in which both of said first and second cylindrical plastic pipes are enclosed, said housing having a generally cylindrical shape, with grey water and fresh water connection fittings protruding from said housing and being externally accessible.

22. The grey water heat exchanger of claim 21 wherein at least one of said first and second cylindrical plastic pipes has a first end closure, and the corresponding one of said first and second tube bundles has first and second ends that both run through said first end closure.

23. The grey water heat exchanger of claim 21 wherein:
said first and second cylindrical plastic pipes stand on a common base and are mounted together in a single mounting with both of said first and second cylindrical plastic pipes being in an upstanding orientation;

said first cylindrical plastic pipe has a first end and a second end, said first end being higher than said second end;

said second end of said first cylindrical plastic pipe having a closure;

said first end of said first cylindrical plastic pipe having a closure having first and second penetrations through which pass respective first and second ends of said first fresh water tube bundle, said first and second penetrations being higher than said grey water outlet of said second cylindrical plastic pipe;

said first fresh water tube bundle has an outside diameter fitting within said first cylindrical plastic pipe to permit construction of said heat exchanger by axial insertion of said first fresh water tube bundle into said first cylindrical plastic pipe;

said second cylindrical plastic pipe has a first end and a second end, said first end being higher than said second end;

said second end of said second cylindrical plastic pipe having a closure;

said first end of said second cylindrical plastic pipe having a closure having first and second penetrations through which pass respective first and second ends of said second fresh water tube bundle, said first and second penetrations of said first end of said second cylindrical plastic pipe being higher than said grey water outlet of said second cylindrical plastic pipe; and said second fresh water tube bundle has an outside diameter fitting within said second cylindrical plastic pipe to permit construction of said heat exchanger by axial insertion of said tube bundle into said second cylindrical plastic pipe.

24. A grey water heat recovery assembly comprising the heat exchanger of claim 21 in combination with a grey water drainage system, a water heater, and a hot water distribution system, wherein:

said fresh water inlet of said heat exchanger is connected to a fresh water supply system downstream of a water meter;

said fresh water outlet of said heat exchanger is connected to an inlet of said water heater;

said water heater has an outlet connected to supply water to at least one of a hot water tap, a shower, a bath-tub, a clothes washer, and a dishwasher;

said grey water drainage system is connected to a drain of at least one of a sink; a shower, a bath-tub, a clothes washer, and a dishwasher;

said grey water drainage system is segregated from any sewage water system;

said grey water drainage system is connected to said grey water inlet of said first cylindrical plastic pipe;

said grey water drainage system includes an overflow bypass of said heat exchanger;

there is a grey water inlet filter mounted to intercept objects in the grey water carried by said grey water drainage system to said heat exchanger; and said outlet of said second cylindrical plastic pipe drains into a sewage drain.

25. The heat exchanger of claim 21 wherein said first tube bundle has an outlet and an inlet, both of said outlet and said inlet being located at one end of said tube bundle, whereby said tube bundle may be extracted from one end of said apparatus.

26. The heat exchanger of claim 25 wherein said first tube bundle includes an inlet header, a return header, an array of feeder tubes extending between said inlet header and said return header, and a return; said inlet header is mounted concentrically about said return, said return passing though said inlet header free of fluid communication therewith.

27. A grey water heat recovery heat exchanger comprising:

a first cylindrical plastic pipe for grey water with a first metal tube bundle for fresh water nested therein; and a second cylindrical plastic pipe for grey water with a second metal tube bundle for fresh water nested therein;

said first cylindrical plastic pipe having an inlet for grey water;

said second cylindrical plastic pipe having an outlet for grey water;

said first and second cylindrical plastic pipes being connected in series to conduct grey water from said first cylindrical plastic pipe to said second cylindrical plastic pipe:

said first metal tube bundle being connected in series with said second metal tube bundle, said second metal tube bundle having a fresh water inlet, said first metal tube bundle having a fresh water outlet, said fresh water tube bundles being mounted for counter-flow operation relative to said grey water conducting first and second cylindrical plastic pipes;

each of said first and second cylindrical plastic pipes defining at least a portion of a respective grey water sump in which at least a portion of a respective one of said second and first metal tube bundles is mounted;

said first and second cylindrical plastic pipes are elongate and are in a predominantly upstanding orientation, and said grey water outlet of said second cylindrical plastic pipe is higher than a predominant portion of each of said first and second fresh water tube bundles; and said apparatus is enclosed in a unitary cylindrical housing in which both of said first and second passes are enclosed, through which externally accessible grey water and fresh water connection fittings pass, the fresh water connection fitting extending through a top end of said cylindrical housing, and said grey water connection fittings extending through a sidewall of said cylindrical housing.

28. A grey water heat recovery apparatus comprising:

a first stage and a second stage mounted in series;

the first stage having a first plastic pipe;

the second stage having a second plastic pipe;

said first and second plastic pipes each being elongate and cylindrical, said first and second pipes being connected in series and being bundled together side-by-side in an upstanding orientation;

each of said first and second pipes having an upper end and a lower end;

said first and second pipes defining a gray water path of a heat exchanger in which said first pipe is upstream of said second pipe;

said first stage has a first tube bundle nested within said first pipe, said first tube bundle having inlet and outlet terminations that extend from the upper end of the first pipe;

said second stage has a second tube bundle nested within said second pipe, said second tube bundle having inlet and outlet terminations that extend from the upper end of said second pipe; and said first tube bundle and said second tube bundle being connected in series to define a fresh water flow path of the heat exchanger, said second tube bundle being upstream of said first tube bundle;

one of said first and second tube bundles has an array of feeder tubes carrying fresh water in a first direction, and a return carrying fresh water in a second, opposite direction; and thermal insulation is mounted to said return.

29. The grey water heat recovery apparatus of claim 28 wherein said apparatus is enclosed in a unitary cylindrical housing in which both of said first and second stages are enclosed, through which externally accessible grey water and fresh water connection fittings pass, the fresh water connection fitting extending through a top end of said cylindrical housing, and said grey water connection fittings extending through a sidewall of said cylindrical housing.

\* \* \* \* \*